US008388432B2

(12) United States Patent
Mattice et al.

(10) Patent No.: US 8,388,432 B2
(45) Date of Patent: Mar. 5, 2013

(54) BI-STABLE DOWNLOADABLE REEL STRIPS

(75) Inventors: Harold Mattice, Gardnerville, NV (US); Chauncey Griswold, Reno, NV (US); Steven LeMay, Reno, NV (US)

(73) Assignee: IGT, Reno, NV (US)

( * ) Notice: Subject to any disclaimer, the term of this patent is extended or adjusted under 35 U.S.C. 154(b) by 1625 days.

(21) Appl. No.: 11/592,614

(22) Filed: Nov. 3, 2006

(65) Prior Publication Data

US 2007/0054730 A1 Mar. 8, 2007

(51) Int. Cl.
*A63F 9/24* (2006.01)
*G06F 17/00* (2006.01)

(52) U.S. Cl. ................ 463/20; 463/31; 463/17; 463/47; 463/30; 345/102; 313/506

(58) Field of Classification Search ........................ None
See application file for complete search history.

(56) References Cited

U.S. PATENT DOCUMENTS

| | | | |
|---|---|---|---|
| 1,488,889 | A | 4/1924 | Lollis |
| 3,864,024 | A | 2/1975 | Olson |
| 4,127,849 | A | 11/1978 | Okor |
| 4,448,419 | A | 5/1984 | Telnaes |
| 4,614,342 | A | 9/1986 | Takashima |
| 4,711,452 | A | 12/1987 | Dickinson et al. |
| 4,712,799 | A | 12/1987 | Fraley |
| 4,838,552 | A | 6/1989 | Hagiwara |
| 4,856,787 | A | 8/1989 | Itkis |
| 4,932,147 | A | 6/1990 | David |
| 5,026,152 | A | 6/1991 | Sharkey |
| 5,135,224 | A | 8/1992 | Yamamoto et al. |
| 5,162,696 | A | 11/1992 | Goodrich |
| 5,239,227 | A | 8/1993 | Kikinis |
| 5,342,047 | A | 8/1994 | Heidel et al. |
| 5,413,357 | A | 5/1995 | Schulze et al. |
| 5,524,888 | A | 6/1996 | Heidel |

(Continued)

FOREIGN PATENT DOCUMENTS

| | | |
|---|---|---|
| EP | 0 134 979 A2 | 3/1985 |
| EP | 0 246 021 A2 | 11/1987 |

(Continued)

OTHER PUBLICATIONS

U.S. Appl. No. 12/247,844, filed Oct. 8, 2008, Paulsen et al.

(Continued)

*Primary Examiner* — Paul A D'Agostino
(74) *Attorney, Agent, or Firm* — Weaver Austin Villeneuve & Sampson LLP

(57) ABSTRACT

Disclosed are gaming machines, gaming machine reels, and configurable reel strips, including related methods, apparatus, and systems, including computer program products, for electronically altering and replacing information shown on a reel of a gaming machine. A reel strip with a configurable surface is provided on the reel. The configurable surface includes a bi-stable material such as electronic paper. The configurable surface of the reel strip has a plurality of configurable regions of the bi-stable material. The configurable regions can be configured to display information such as designated symbols of a game of chance. In this way, the displayed symbols can be replaced without having to physically replace the reel strip or reel. Generally, symbol information is output for display on the configurable regions during a power on state. The bi-stable nature of the configurable regions enables the designated symbols to also be displayed during a power off state.

35 Claims, 14 Drawing Sheets

U.S. PATENT DOCUMENTS

| | | | | |
|---|---|---|---|---|
| 5,580,055 | A | 12/1996 | Hagiwara | |
| 5,634,080 | A | 5/1997 | Kikinis et al. | |
| 5,680,160 | A | 10/1997 | LaPointe | |
| 5,688,551 | A * | 11/1997 | Littman et al. | 427/64 |
| 5,752,881 | A | 5/1998 | Inoue | |
| 5,770,533 | A | 6/1998 | Franchi | |
| 5,770,914 | A | 6/1998 | Pease et al. | |
| 5,788,573 | A | 8/1998 | Baerlocher et al. | |
| 5,803,453 | A | 9/1998 | Stephan et al. | |
| 5,807,172 | A | 9/1998 | Piechowiak | |
| 5,816,918 | A | 10/1998 | Kelly et al. | |
| 5,839,957 | A | 11/1998 | Schneider et al. | |
| 5,839,960 | A | 11/1998 | Parra et al. | |
| 5,911,419 | A | 6/1999 | Delaney et al. | |
| 5,924,926 | A | 7/1999 | Brown | |
| 5,929,474 | A | 7/1999 | Huang et al. | |
| 5,934,672 | A | 8/1999 | Sines et al. | |
| 5,947,820 | A | 9/1999 | Morro et al. | |
| 5,951,397 | A | 9/1999 | Dickinson | |
| 5,965,907 | A | 10/1999 | Huang et al. | |
| 5,971,271 | A | 10/1999 | Wynn et al. | |
| 5,977,704 | A | 11/1999 | Shi et al. | |
| 6,002,206 | A | 12/1999 | Harrison et al. | |
| 6,008,784 | A | 12/1999 | Acres et al. | |
| 6,016,176 | A | 1/2000 | Kim et al. | |
| 6,027,115 | A * | 2/2000 | Griswold et al. | 273/143 R |
| 6,033,307 | A | 3/2000 | Vancura | |
| 6,068,552 | A | 5/2000 | Walker et al. | |
| 6,075,316 | A | 6/2000 | Shi et al. | |
| 6,082,887 | A | 7/2000 | Feuer et al. | |
| 6,086,066 | A | 7/2000 | Takeuchi et al. | |
| 6,135,884 | A | 10/2000 | Hedrick et al. | |
| 6,155,925 | A | 12/2000 | Giobbi et al. | |
| 6,162,121 | A | 12/2000 | Morro et al. | |
| 6,166,496 | A | 12/2000 | Lys et al. | |
| 6,205,690 | B1 | 3/2001 | Heropoulos et al. | |
| 6,229,505 | B1 | 5/2001 | Fujii | |
| 6,251,014 | B1 | 6/2001 | Stockdale et al. | |
| 6,254,481 | B1 | 7/2001 | Jaffe et al. | |
| 6,264,561 | B1 | 7/2001 | Saffari et al. | |
| 6,287,202 | B1 | 9/2001 | Pascal et al. | |
| 6,315,666 | B1 | 11/2001 | Mastera et al. | |
| 6,366,016 | B1 * | 4/2002 | Sakaguchi et al. | 313/506 |
| 6,368,216 | B1 | 4/2002 | Hedrick et al. | |
| 6,406,371 | B1 | 6/2002 | Baba et al. | |
| 6,454,649 | B1 | 9/2002 | Mattice et al. | |
| 6,464,581 | B1 | 10/2002 | Yoseloff et al. | |
| 6,485,884 | B2 * | 11/2002 | Wolk et al. | 430/200 |
| 6,502,758 | B2 | 1/2003 | Cottrell | |
| 6,503,147 | B1 | 1/2003 | Stockdale et al. | |
| 6,517,433 | B2 | 2/2003 | Loose et al. | |
| 6,523,824 | B1 | 2/2003 | Colapinto et al. | |
| 6,530,165 | B2 | 3/2003 | Griesemer et al. | |
| 6,609,968 | B1 | 8/2003 | Okada et al. | |
| 6,638,165 | B2 | 10/2003 | Uchiyama et al. | |
| 6,659,866 | B2 | 12/2003 | Frost et al. | |
| 6,722,987 | B2 * | 4/2004 | Orr et al. | 463/31 |
| 6,743,094 | B2 | 6/2004 | Johnson | |
| 6,743,102 | B1 | 6/2004 | Fiechter et al. | |
| 6,773,345 | B2 * | 8/2004 | Walker et al. | 463/17 |
| 6,786,818 | B1 | 9/2004 | Rothschild et al. | |
| 6,798,148 | B2 | 9/2004 | Inukai | |
| 6,817,946 | B2 | 11/2004 | Motegi et al. | |
| 6,893,345 | B2 | 5/2005 | Motegi et al. | |
| 6,908,387 | B2 | 6/2005 | Hendrick et al. | |
| 6,911,781 | B2 | 6/2005 | Yamazaki et al. | |
| 6,923,720 | B2 | 8/2005 | Loose | |
| 6,939,226 | B1 | 9/2005 | Joshi | |
| 7,008,324 | B1 | 3/2006 | Johnson et al. | |
| 7,048,629 | B2 | 5/2006 | Sines et al. | |
| 7,053,890 | B2 | 5/2006 | Inukai | |
| 7,121,945 | B2 | 10/2006 | Suganuma et al. | |
| 7,169,048 | B2 * | 1/2007 | Nozaki et al. | 463/30 |
| 7,204,753 | B2 | 4/2007 | Ozaki et al. | |
| 7,335,101 | B1 | 2/2008 | Luciano, Jr. | |
| 7,344,442 | B2 | 3/2008 | Inoue | |
| 7,542,198 | B2 * | 6/2009 | Kothari | 359/290 |
| 7,682,249 | B2 | 3/2010 | Winans et al. | |
| 7,811,170 | B2 | 10/2010 | Winans et al. | |
| 7,887,408 | B2 | 2/2011 | Walker et al. | |
| 8,002,624 | B2 | 8/2011 | Paulsen et al. | |
| 8,016,670 | B2 | 9/2011 | LeMay et al. | |
| 8,092,305 | B2 | 1/2012 | Seelig et al. | |
| 8,096,878 | B2 | 1/2012 | Durham et al. | |
| 8,137,176 | B2 | 3/2012 | Bernard et al. | |
| 2002/0012898 | A1 * | 1/2002 | Shechter et al. | 434/21 |
| 2002/0082083 | A1 | 6/2002 | Ito et al. | |
| 2002/0142846 | A1 | 10/2002 | Paulsen | |
| 2002/0173354 | A1 * | 11/2002 | Winans et al. | 463/20 |
| 2002/0175466 | A1 | 11/2002 | Loose et al. | |
| 2002/0187831 | A1 | 12/2002 | Arikawa et al. | |
| 2003/0032479 | A1 | 2/2003 | LeMay et al. | |
| 2003/0045343 | A1 | 3/2003 | Luccesi et al. | |
| 2003/0060269 | A1 | 3/2003 | Paulsen et al. | |
| 2003/0064784 | A1 | 4/2003 | Wells et al. | |
| 2003/0195045 | A1 * | 10/2003 | Kaminkow et al. | 463/47 |
| 2003/0220134 | A1 | 11/2003 | Walker et al. | |
| 2003/0220139 | A1 | 11/2003 | Peterson | |
| 2003/0232651 | A1 | 12/2003 | Huard et al. | |
| 2004/0082385 | A1 | 4/2004 | Silva et al. | |
| 2004/0102245 | A1 | 5/2004 | Escalera et al. | |
| 2004/0142745 | A1 | 7/2004 | Hosaka | |
| 2004/0166940 | A1 | 8/2004 | Rothschild | |
| 2004/0219978 | A1 | 11/2004 | Teramoto et al. | |
| 2004/0266518 | A1 | 12/2004 | Gauselmann et al. | |
| 2005/0054423 | A1 | 3/2005 | Wadleigh | |
| 2005/0054440 | A1 | 3/2005 | Anderson et al. | |
| 2005/0101387 | A1 | 5/2005 | Wolf | |
| 2005/0153776 | A1 | 7/2005 | LeMay et al. | |
| 2005/0170736 | A1 | 8/2005 | Cok | |
| 2005/0170890 | A1 | 8/2005 | Rowe et al. | |
| 2005/0272505 | A1 | 12/2005 | Okamura | |
| 2006/0014580 | A1 * | 1/2006 | Hawthorn | 463/20 |
| 2006/0100013 | A1 | 5/2006 | Enzminger | |
| 2006/0100019 | A1 | 5/2006 | Hornik | |
| 2006/0128467 | A1 | 6/2006 | Thomas | |
| 2006/0281529 | A1 | 12/2006 | Seelig et al. | |
| 2007/0004510 | A1 | 1/2007 | Underdahl et al. | |
| 2007/0052660 | A1 * | 3/2007 | Montbach et al. | 345/102 |
| 2007/0093290 | A1 | 4/2007 | Winans et al. | |
| 2007/0283265 | A1 | 12/2007 | Portano | |
| 2007/0293299 | A1 | 12/2007 | Aida | |
| 2008/0020827 | A1 | 1/2008 | Underdahl et al. | |
| 2008/0096624 | A1 * | 4/2008 | Rydberg | 463/11 |
| 2008/0200233 | A1 | 8/2008 | Aida | |
| 2008/0214277 | A1 | 9/2008 | Kishi | |
| 2009/0104969 | A1 | 4/2009 | Paulsen et al. | |

FOREIGN PATENT DOCUMENTS

| | | | |
|---|---|---|---|
| EP | 0 288 152 | B1 | 10/1988 |
| EP | 0 896 308 | A1 | 2/1999 |
| EP | 1 082 980 | A2 | 3/2001 |
| EP | 1 291 829 | | 3/2003 |
| EP | 1 422 673 | | 5/2004 |
| EP | 1 550 987 | | 7/2005 |
| GB | 2092795 | | 8/1982 |
| GB | 2116345 | | 9/1983 |
| GB | 2253299 | | 9/1992 |
| GB | 2447481 | | 9/2008 |
| JP | 2002-360908 | | 12/2002 |
| JP | 2004-081826 | | 3/2004 |
| JP | 2004-089689 | | 3/2004 |
| WO | WO 98/03962 | | 1/1998 |
| WO | WO 98/50804 | | 11/1998 |
| WO | WO 00/55879 | | 9/2000 |
| WO | WO 00/60669 | | 10/2000 |
| WO | WO 02/17613 | | 2/2002 |
| WO | WO 02/091319 | | 11/2002 |
| WO | WO 2005/071628 | | 8/2005 |
| WO | WO 2005/114600 | | 12/2005 |
| WO | WO 2008/030781 | | 3/2008 |
| WO | WO 2008/057929 | | 5/2008 |
| WO | WO 2010/042328 | | 4/2010 |

OTHER PUBLICATIONS

International Search Report dated Jun. 6, 2005 issued in PCT/US2005/000387.

Written Opinion dated Jun. 6, 2005 issued in PCT/US2005/000387.
International Preliminary Report on Patentability dated Jul. 27, 2006 issued in PCT/US2005/000387.
International Search Report dated Apr. 16, 2008 issued in PCT/US2007/083315.
Written Opinion dated Apr. 16, 2008 issued in PCT/US2007/083315.
International Search Report mailed Apr. 9, 2008 issued in PCT/US2007/077453.
Written Opinion dated Apr. 9, 2008 issued in PCT/US2007/077453.
Russian Office Action dated Dec. 15, 2006 issued in 2006124191/20 (026231).
US Office Action dated Jul. 12, 2007 issued in U.S. Appl. No. 10/756,225.
US Final Office Action dated Jan. 8, 2008 issued in U.S. Appl. No. 10/756,225.
US Office Action dated Jun. 26, 2008 issued in U.S. Appl. No. 10/756,225.
US Notice of Allowance dated Sep. 22, 1999 issued in U.S. Appl. No. 09/047,889.
US Office Action dated Mar. 30, 1999 issued in U.S. Appl. No. 09/047,889.
US Office Action dated Mar. 24, 2003 issued in U.S. Appl. No. 09/964,962.
US Office Action dated Oct. 7, 2003 issued in U.S. Appl. No. 09/964,962.
US Final Office Action dated Apr. 26, 2004 issued in U.S. Appl. No. 09/964,962.
US Office Action dated May 2, 2006 issued in U.S. Appl. No. 09/964,962.
US Office Action (Interview Summary) dated Jul. 10, 2006 issued in U.S. Appl. No. 09/964,962.
US Final Office Action dated Dec. 7, 2006 issued in U.S. Appl. No. 09/964,962.
US Office Action dated Sep. 20, 2007 issued in U.S. Appl. No. 09/964,962.
US Office Action dated Aug. 8, 2008 issued in U.S. Appl. No. 09/964,962.
AV Video: Announce World's First Video-Capable Flexible Plastic LCD Display: Jun. 2001, http://www.avvideo.com/2001/06_jun/news/plastic_video.htm.
Brochure describing "Electroluminescent Display" available from Planar Corporation, prior to Jan. 1997 (3 pages).
Del Conte, Natali T., "Philips Demos Digital Game Board" downloaded from internet at http://www.pcmag.com/article2/0,1895,2009874.asp, Article date: Aug. 29, 2006, 2 pages.
Display of "High Rollers Triple Diamond" Gaming Machine at a casino in Nevada in about 1995 (photograph of similar machine).
"Display Panels with Electronic Ink", Fraunhofer Magazin, Fraunhofer Gesellschaft, Muenchen, DE 2:38-39, XP002344237.
"First Generation Electronic Paper Display From Philips, Sony and E Ink to be Used in New Electronic Reading Device", (Mar. 24, 2004) [online] [retrieved on Sep. 8, 2005] URL:http://www.eink.com/news/releases/pr70.html.
"Foled Flexible Organic Light Emitting Device," Universal Display Corporation Online: http://www.universaldisplay.com/foled.php, pp. 1-2, printed Apr. 26, 2001.
Kavoossi B, (Dec. 12, 2001) "Printed microsystems on paper", [Retrieved on Sep. 9, 2005] URL:http://www.tekes.fi/julkaisut/Active_imaging.pdf.
Lieberman, David, "Push is on to Replace Glass with Plastic in LCDs," EETimes.com: http://www.eetimes.com/story/OEG19990615S0031, pp. 1-4, dated Jun. 15, 1999, printed Sep. 6, 2000.
"The Tube." Businessweek Online:http://www/bisomessweel/cp,:/2000_10/design3.htm?scriptFramed, pp. 1-2, dated Mar. 6, 2000, printed Dec. 20, 2001.
US Final Office Action dated Feb. 2, 2009 issued in U.S. Appl. No. 10/756,225.
US Advisory Action dated Apr. 21, 2009 issued in U.S. Appl. No. 10/756,225.
US Office Action dated Jul. 7, 2009 issued in U.S. Appl. No. 10/756,225.
US Office Action dated Jun. 23, 2009 issued in U.S. Appl. No. 11/517,861.
US Examiner Interview Summary dated Sep. 18, 2009 issued in U.S. Appl. No. 11/517,861.
US Office Action dated Mar. 15, 2010 issued in U.S. Appl. No. 11/517,861.
US Office Action dated Jun. 25, 2009 issued in U.S. Appl. No. 11/880,937.
US Examiner Interview Summary dated Sep. 18, 2009 issued in U.S. Appl. No. 11/880,937.
US Office Action Final dated Jan. 21, 2010 issued in U.S. Appl. No. 11/880,937.
US Final Office Action dated Apr. 21, 2009 issued in U.S. Appl. No. 09/964,962.
US Office Action dated Jul. 6, 2009 issued in U.S. Appl. No. 09/964,962.
US Office Action Final dated Mar. 16, 2010 issued in U.S. Appl. No. 09/964,962.
US Office Action Final dated Aug. 16, 2010 issued in U.S. Appl. No. 09/964,962.
US Office Action dated Oct. 5, 2005 issued in U.S. Appl. No. 10/139,801.
US Office Action Final dated Mar. 16, 2006 issued in U.S. Appl. No. 10/139,801.
US Office Action dated Jul. 6, 2006 issued in U.S. Appl. No. 10/139,801.
US Office Action Final dated Jan. 5, 2007 issued in U.S. Appl. No. 10/139,801.
US Advisory Action dated Apr. 4, 2007 issued in U.S. Appl. No. 10/139,801.
US Examiner Interview Summary dated Apr. 26, 2007 issued in U.S. Appl. No. 10/139,801.
US Office Action dated Jun. 4, 2007 issued in U.S. Appl. No. 10/139,801.
US Office Action Final dated Feb. 21, 2008 issued in U.S. Appl. No. 10/139,801.
US Office Action dated Aug. 20, 2008 issued in U.S. Appl. No. 10/139,801.
US Office Action dated Jan. 30, 2009 issued in U.S. Appl. No. 10/139,801.
US Examiner Interview Summary dated Aug. 13, 2009 issued in U.S. Appl. No. 10/139,801.
US Notice of Allowance dated Sep. 14, 2009 issued in U.S. Appl. No. 10/139,801.
US Notice of Allowance dated Dec. 2, 2009 issued in U.S. Appl. No. 10/139,801.
US Office Action dated Oct. 31, 2008 issued in U.S. Appl. No. 11/546,659.
US Office Action dated May 12, 2009 issued in U.S. Appl. No. 11/546,659.
US Examiner Interview Summary dated Aug. 12, 2009 issued in U.S. Appl. No. 11/546,659.
US Notice of Allowance dated Apr. 20, 2010 issued in U.S. Appl. No. 11/546,659.
US Notice of Allowance dated Aug. 26, 2010 issued in U.S. Appl. No. 11/546,659.
AU Examiner's First Report dated Nov. 13, 2009 issued in 2005207295.
AU Notice of Acceptance dated Aug. 25, 2010 issued in 2005207295.
Chinese First Office Action dated Nov. 28, 2008 issued in 200580002282.8.
Chinese Second Office Action dated Mar. 1, 2010 issued in 200580002282.8.
European Office Action dated Apr. 24, 2009 issued in 05 705 161.7-1238.
Mexican Office Action dated May 12, 2009 issued in 06/07949.
Russian Office Action dated Dec. 8, 2008 issued in 2006124191/09 (026231).
European Examination Report dated Oct. 30, 2009 issued in 07 863 774.1-2221.
European Examination Report dated Jun. 4, 2010 issued in 07 863 774.1-2221.

PCT International Search Report and Written Opinion dated Jan. 21, 2010 issued in PCT/US2009/058261.
PCT International Search Report dated Aug. 14, 2003 issued in PCT/US02/13863.
PCT Written Opinion dated Sep. 24, 2003 issued in PCT/US02/13863.
PCT International Preliminary Examination Report dated Nov. 24, 2003 issued in PCT/US02/13863.
Patent Abstracts of Japan vol. 2000, No. 09, Oct. 13, 2000 & JP 2000 172444 A (Semiconductor Energy Lab Co LTD), Jun. 23, 2000 abstract.
Patent Abstracts of Japan vol. 2000, No. 20, Jul. 10, 2001 & JP 2001 076886 A (Futaba Corp), Mar. 23, 2001 abstract.
Australian Examiner's First Report dated Feb. 16, 2007 issued in AU 2002256429.
Australian Examiner's First Report dated Jan. 15, 2009 issued in AU 2007216701.
EP Examination Report dated Dec. 9, 2005 issued in EP 02 725 894.6-2218.
EP Examination Report dated Jan. 12, 2007 issued in EP 02 725 894.6-2218.
EP Examiner's Report dated Jul. 20, 2009 issued in EP 02 725 894.6-2218.
IBM, Organic Light Emitting Diodes Project, Apr. 16, 2002, http://www.almaden.ibm.com/st/projects/oleds/.
Kodak, What It Is Apr. 25, 2002 http://www.kodak.corn/US/en/corp/display/overview.jhtml.
Rolltronics, By Dr. James Sheats, Introduction to Organic Light-Emitting Diodes (OLEDs), Apr. 16, 2002, http://www.rolltronics.com/intro oled.htp.
Universal Display Corporation, "From Passive to Active Matrix", Apr. 25, 2002, <http://www.universaldisplay.com/matrix.php>.
Universal Display Corporation, FOLED Flexible Organic Light Emitting Device, Apr. 25, 2002, http://www.universaldisplay.com/foled.php.
US Office Action dated Apr. 28, 2011 issued in U.S. Appl. No. 10/756,225.
US Examiner Interview Summary dated May 10, 2011 issued in U.S. Appl. No. 10/756,225.
US Notice of Allowance dated Jun. 24, 2011 issued in U.S. Appl. No. 10/756,225.
US Notice of Allowance dated Jul. 18, 2011 issued in U.S. Appl. No. 10/756,225.
US Office Action dated Jul. 28, 2011 issued in U.S. Appl. No. 11/517,861.
US Examiner Interview Summary dated Office Action dated Sep. 26, 2011 issued in U.S. Appl. No. 11/517,861.
US Final Office Action dated Nov. 2, 2011 issued in U.S. Appl. No. 11/517,861.
US Office Action dated Dec. 21, 2010 issued in U.S. Appl. No. 09/964,962.
US Examiner Interview Summary dated Mar. 10, 2011 issued in U.S. Appl. No. 09/964,962.
US Notice of Allowance dated Apr. 1, 2011 issued in U.S. Appl. No. 09/964,962.
Canadian Office Action dated Apr. 12, 2011 issued in CA 2,552,400.
Chinese Third Office Action dated Feb. 16, 2011 issued in 200580002282.8.
Chinese Fourth Office Action dated Sep. 15, 2011 issued in 200580002282.8.
AU Examiner's first report dated Aug. 5, 2011 issued in AU 2007317424.
AU First Office Action dated Aug. 24, 2011 issued in AU 2007317424.
PCT International Preliminary Report on Patentability and Written Opinion dated Apr. 21, 2010 issued in PCT/US2009/058261.
US Office Action dated Mar. 27, 2012 issued in U.S. Appl. No. 12/247,844.
US Applicant Initiated Interview Summary dated May 16, 2012 issued in U.S. Appl. No. 12/247,844.
US Notice of Allowance dated Jul. 16, 2012 issued in U.S. Appl. No. 12/247,844.
US Allowed Claims dated Jul. 16, 2012 for U.S. Appl. No. 12/247,844.
Canadian Second Office Action dated Mar. 28, 2012 issued in CA 2,552,400.
Chinese Fifth Office Action dated Dec. 23, 2011 issued in 200580002282.8.
AU Examiner's report No. 2 dated Dec. 20, 2011 issued in AU 2007317424.
European Communication Report dated Feb. 3, 2011 issued in 07 863 774.1-2221.

* cited by examiner

BI-STABLE DOWNLOADABLE REEL STRIPS

CROSS-REFERENCE TO RELATED APPLICATIONS

This application is related to U.S. patent application Ser. No. 10/756,225, LeMay et al., entitled "VIRTUAL GLASS FOR A GAMING MACHINE" and filed on Jan. 12, 2004, which is hereby incorporated by reference for all purposes.

FIELD OF THE INVENTION

The present invention relates to gaming machines, such as slot machines and video poker machines. More particularly, the present invention relates to configuring and updating reel strips for spinning reels of slot machines.

BACKGROUND OF THE INVENTION

Gaming in the United States is divided into Class I, Class II and Class III games. Class I gaming includes social games played for minimal prizes, or traditional ceremonial games. Class II gaming includes bingo games, pull tab games if played in the same location as bingo games, lotto, punch boards, tip jars, instant bingo, and other games similar to bingo. Class III gaming includes any game that is not a Class I or Class II game, such as a game of chance typically offered in non-Indian, state-regulated casinos. Many games of chance that are played on gaming machines fall into the Class II and Class III categories of games.

As technology in the gaming industry progresses, the traditional mechanically driven reel slot machines are being updated with electronic components. Some modern electronic gaming machines have video displays based on CRT, LCD or the like. Electronic gaming machines, such as video slot machines and video poker machines, are becoming increasingly popular. Part of the reason for their increased popularity is the nearly endless variety of games that can be implemented on a single gaming machine.

Typically, using a master gaming controller, a gaming machine controls various combinations of devices that allow a player to play a game on the gaming machine and also encourage game play on the gaming machine. For example, a game played on a gaming machine usually requires a player to input money or an indicia of credit into the gaming machine, indicate a wager amount, and initiate game play. These steps require the gaming machine to control input devices, such as bill acceptors/validators and coin acceptors, to accept money into the gaming machine and recognize user inputs from devices, including key pads, button pads, card readers, and ticket readers, to determine the wager amount, and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play.

Maintaining a game player's interest in game play, such as on a gaming machine or during other gaming activities, is an important consideration for an operator of a gaming establishment. As technology in the gaming industry progresses, more and more electronic components are being incorporated into gaming machines to maintain player interest. For instance, many gaming machines have entirely replaced mechanical slot reels with video displays to simulate the visual effect of the mechanical reels. Video displays facilitate the play of many different slot games on a single machine. Video displays also provide graphics, which can be combined with music and sounds to stimulate the player.

Another method of gaining and maintaining interest in game play is to provide a gaming machine with a plurality of games. Although conventional mechanical gaming machines have provided only a single game per machine, modern video-based machines permit a player to select from a number of different games on the same machine. However, this multi-game capability has not been implemented on mechanical slot machines incorporating mechanical reels.

As mechanical components of gaming machines are replaced with electronics, many players feel the machines are too controlled. Thus, some players feel their chances of winning might be better with traditional mechanical-driven gaming machines. For this reason and others, such as past experience and comfort level, many players are still attracted by the look and feel of mechanical-driven slot machines.

It is often desirable to change a game theme or add new capabilities or features to a particular mechanical-driven slot machine once that machine has been deployed. However, such changes can be expensive and difficult. The creation and installation of a new mechanical slot game involves manufacturing and printing of new reel strips, and physical replacement and installation of the strips on the mechanical reels every time a new game is deployed. Such retrofitting results in materials, time, labor, and other cost demands for the mechanical design, construction, purchase, and installation of new reel strips or reels in the machine, even when new software and/or other electronic components are not needed. Hence, retrofitting a mechanical reel-based machine to generate and maintain interest in game play can represent a significant expense to a casino.

What is needed is an effective scheme for providing different games on mechanical reel slot machines. Updating and replacing the displayed reel strips on the mechanical reels is desired, without requiring a service technician to manually replace the physical reel strips and/or reels to implement the new game. It would also be desirable to have flexibility, so a limitless variety of symbols, numbers, and other outputs could be displayed on the reel strips. Also, it would be desirable to provide improved apparatuses and methods for updating reel strips with minimal power and space requirements.

SUMMARY OF THE INVENTION

Disclosed are gaming machines, including related methods, apparatus, and systems, including computer program products, implementing and using techniques for providing a game of chance.

Aspects of the present invention provide apparatus and methods for electronically altering and replacing reel strips on a gaming machine. The provided apparatus and methods involve the use of bi-stable downloadable reel strips, whereby the displayed symbols on a reel strip can be replaced without having to physically remove and replace the reel strip and/or reel. This is accomplished by providing a streamlined, low power, low cost, low space requirement reel strip constructed of a bi-stable material such as electronic paper to display images on the reels.

In one aspect of the present invention, a bi-stable downloadable reel strip system has at least one host adapted to present image content to a bi-stable reel strip, and at least one host storage unit adapted to store image content accessible to the host. A reel strip controller is in communication with the host. The reel strip controller receives image content from the host, and outputs the image content in the form of stop number and symbol information to the bi-stable reel strip for display.

In one aspect of the present invention, a gaming machine has a reel with a configurable surface for controlling information shown on the reel. The gaming machine includes a cabinet, a player input device, a master gaming controller, an output device, a plurality of reels, and a controller. The player input device is capable of receiving a wager for play of a game of chance. The master gaming controller is configured to provide one or more outcomes of the game of chance. The output device is configured to provide an award for one or more of the outcomes. The plurality of reels are mounted in the cabinet. One or more of the reels include an internal supporting member having a curved surface defining an outer circumferential portion, and a reel strip mounted on the outer circumferential portion of the internal supporting member. The reel strip has a plurality of configurable regions of bi-stable material defining the configurable surface. The configurable regions are capable of being configured to display designated symbols for the game of chance. The internal supporting member is rotatable about an axis to display one of the symbols as a part of the one or more outcomes. The controller is coupled to the configurable regions of the reel strip. The controller is configured to output symbol information designating a symbol to be displayed on one or more of the configurable regions during a power on state in which a power supply is coupled to the one or more configurable regions. The configurable regions are capable of displaying the designated symbols during a power off state in which the power supply is de-coupled from the configurable regions.

In one implementation, the bi-stable material is electronic paper, such as color electronic paper. The controller can be implemented as a reel output controller, a master gaming controller, and/or can include one or more processors. In one implementation, communications apparatus is coupled to provide the symbol information to the controller. The communications apparatus can include a slip ring coupled to a brush block, or a wireless receiver capable of receiving the symbol information from a wireless transmitter. A switching mechanism can be provided to control the coupling and decoupling of the power supply. In one implementation, the symbol information is provided in a plurality of dimensions of data. In one implementation, one of the dimensions of data identifies the reel, another of the dimensions identifies the configurable region, a further one or more of the dimensions provide the designated symbol, and yet another one or more of the dimensions of data provide pixel values of the designated symbol.

In another aspect of the present invention, a configurable reel is adapted to be mounted in a gaming machine cabinet for play of a game of chance. The reel has a configurable surface for controlling information on the reel. The reel includes an internal supporting member and a reel strip. The internal supporting member is rotatable about an axis and has a curved surface defining an outer circumferential portion. The reel strip is mounted on the outer circumferential portion of the internal supporting member. The reel strip has a plurality of configurable regions of bi-stable material defining the configurable surface. The configurable regions are capable of being configured to display designated symbols for the game of chance. At least one of the configurable regions is capable of being coupled to a processor configured to output symbol information designating a symbol to be displayed on the configurable region during a power on state in which a power supply is coupled to the configurable region. The configurable region is capable of displaying the designated symbol during a power off state in which the power supply is decoupled from the configurable region. In one implementation, the one or more configurable regions include a pattern of pixels.

In another aspect of the present invention, a configurable gaming system has configurable surfaces for controlling information shown for one or more games of chance. The system includes at least one gaming machine and a host device. The gaming machine includes a cabinet, a player input device, a master gaming controller, an output device, a plurality of reels, a controller, and a communications interface. The player input device is capable of receiving a wager for play of the game of chance. The master gaming controller is configured to provide one or more outcomes of the game of chance. The output device is configured to provide an award for a selected one of the outcomes. A plurality of reels are mounted in the cabinet. At least one of the reels includes an internal supporting member and a reel strip. The internal supporting member has a curved surface defining an outer circumferential portion. The reel strip is mounted on the outer circumferential portion of the internal supporting member. The reel strip has a plurality of configurable regions of bi-stable material defining the configurable surface. The configurable regions are capable of being configured to display designated symbols for the game of chance. The internal supporting member is rotatable about an axis to display one of the symbols as a part of the one or more outcomes. The controller is coupled to the configurable regions of the reel strip. The controller is configured to output symbol information designating a symbol to be displayed on one or more of the configurable regions during a power on state in which a power supply is coupled to the one or more configurable regions. The configurable regions are capable of displaying the designated symbols during a power off state in which the power supply is de-coupled from the configurable regions. The communications interface is coupled to a communications line. The host device is in communication with the communications interface of the gaming machine through the communications line. The host device is configured to send the symbol information to the gaming machine through the communications line.

In one implementation, the host device is one of the gaming machines. In another implementation, the host device is a data processing apparatus such as a server, personal computer, a lap top computer, a personal digital assistant, a mobile phone, and any combination of such apparatus. The symbol information, in one example, is a component of game theme information.

Yet another aspect of the present invention relates to a method of configuring a gaming machine for controlling information shown on a reel having a configurable surface for providing a game of chance. A reel is mounted in the cabinet. The reel includes an internal supporting member having a curved surface defining an outer circumferential portion. A reel strip is mounted on the outer circumferential portion of the internal supporting member. The reel strip has a plurality of configurable regions of bi-stable material defining the configurable surface. The configurable regions are capable of being configured to display designated symbols for the game of chance. The internal supporting member is rotatable about an axis to display one of the symbols as a part of the one or more outcomes. An update message is received, indicating that one or more configurable regions are to be configured. Responsive to the update message, power is provided to the one or more configurable regions to define a power on state. Symbol information is output, designating a symbol to be displayed on one or more of the configurable regions during the power on state. The configurable regions are capable of displaying the designated symbols during a power off state in which the power is not provided to the configurable regions.

In one implementation, the update message is received from a player input device. In another implementation, the update message is received from a controller in the gaming machine. In yet another implementation, the update message is received from a host device selected from the group consisting of a further gaming machine, a server, a personal computer, a lap top computer, a personal digital assistant, and a mobile phone. In one implementation, a symbol list is retrieved from a memory device. The symbol list provides the symbol information. The memory device can be situated at a remote location with respect to the gaming machine. Alternatively, the memory device can be local, for instance, coupled to the controller. The symbol information can identify reel stops corresponding to the one or more configurable regions.

All of the foregoing methods and apparatus, along with other methods and apparatus of aspects of the present invention, may be implemented in software, firmware, hardware and combinations thereof. For example, the methods of aspects of the present invention may be implemented by computer programs embodied in machine-readable media and other products. Also, aspects of the invention may be implemented by networked gaming machines, game servers and other such devices. These and other features and benefits of aspects of the invention will be described in more detail below with reference to the associated drawings.

BRIEF DESCRIPTION OF THE DRAWINGS

The invention may best be understood by reference to the following description taken in conjunction with the accompanying drawings, which are illustrative of specific embodiments of the present invention.

DESCRIPTION OF THE PREFERRED EMBODIMENTS

Figure 1:
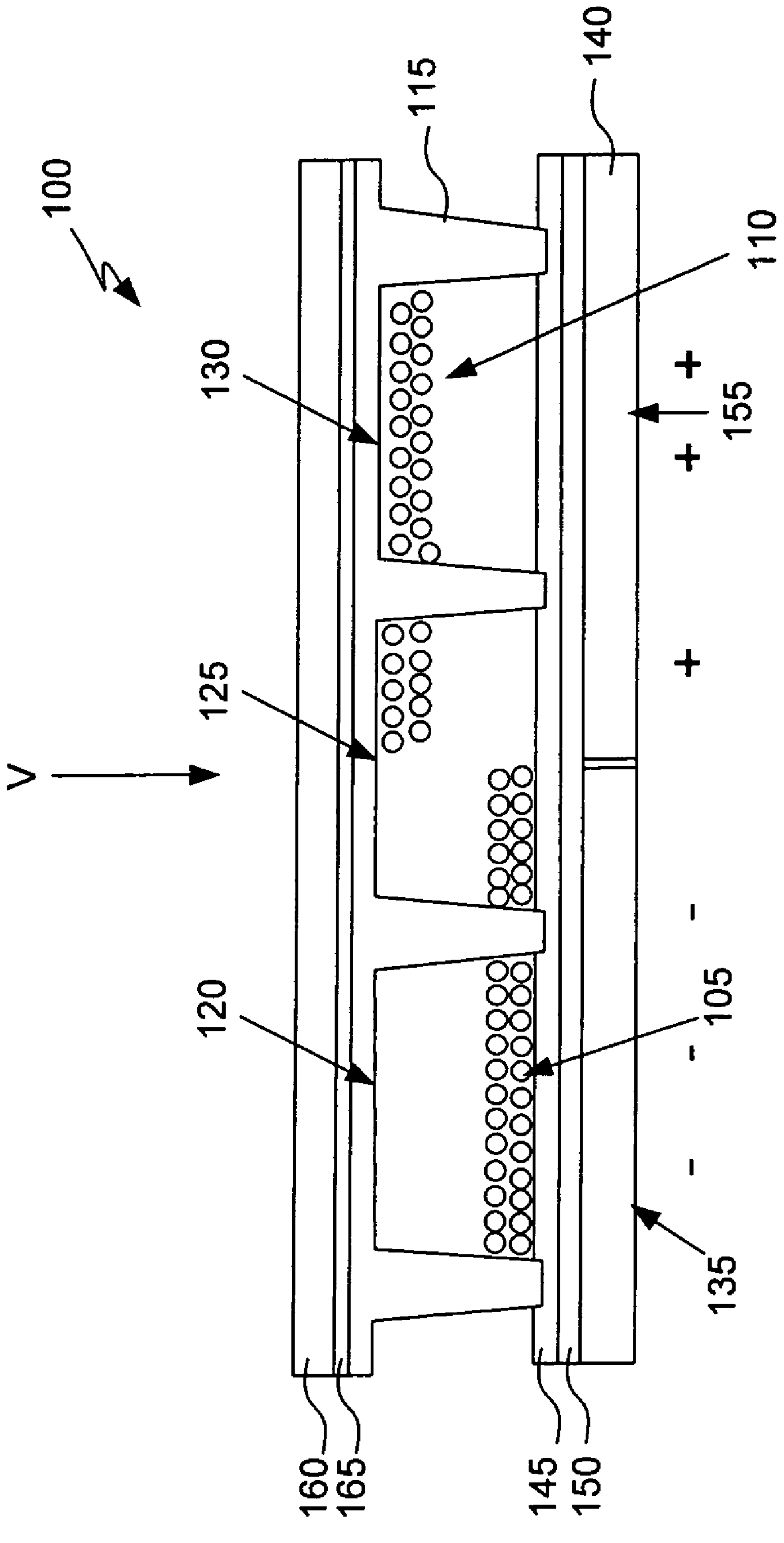
FIG. 1 shows a cross-sectional view of electronic paper 100 for use as a bi-stable material of a reel strip constructed according to one embodiment of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

Embodiments of the present invention relate to a bi-stable material providing configurable surfaces on a reel of a gaming machine, such as a slot machine. It can be said that the pixels of the material are bi-stable, because the state of each pixel can be maintained without a constant supply of power. The information displayed on the configurable surface can be downloaded from a data source and changed as desired.

Embodiments of the present invention provide for configurable regions defined in the configurable surface. Each region is configurable to display one or more symbols of a game of chance, such as a slot game. Different reel symbols and sets of reel symbols can be electronically downloaded from a gaming server or other gaming machine to the slot machine. A controller in the slot machine is operatively coupled to update the configurable regions to display the downloaded reel symbols. In this way, a game provided on the slot machine can be changed as desired. Because of the bi-stable nature of the configurable surface, the reel strip only needs to have power when the displayed information is updated. Otherwise, the power can be switched off. Because of the electronic download and update capabilities of the bi-stable configurable reels, alteration or replacement of the physical reel strips and reels is not necessary to update or change the game.

Electronic paper is one possible implementation of a bi-stable material used to form reel strips having surfaces with configurable regions, in accordance with embodiments of the present invention. Electronic paper can be disposed as a reel strip about the outer surface of a reel, as described herein. One suitable electronic paper for use with embodiments of the present invention is electronic paper display technology incorporating electronic ink, manufactured by E Ink Corp.

As known to those skilled in the art, electronic paper possesses a paper-like high contrast appearance, low power consumption, and a thin, light form. Electronic paper gives the viewer the experience of reading from paper, while having the capability of updatable information. Electronic ink in the paper carries a charge enabling it to be updated electronically. Electronic ink is a reflective technology that requires no front or backlight, is viewable under a wide range of lighting conditions, including direct sunlight. Unlike most other display technologies, electronic paper has image memory. In other words, once an image is displayed, no power is required to maintain the image content. The image remains after power is removed.

Electronic paper is flexible and can conform to various shapes. Electronic paper is suitable for mounting on curved surfaces due to its thin form factor and inherent flexibility. Unlike other display technologies such as liquid crystal displays (LCD), an image displayed on electronic paper looks the same from all viewing angles and will not distort when touched or flexed, making electronic ink a preferred display medium for flexible displays.

There are many methods of forming electronic paper. The type that will be described in most detail herein is a form of "electrophoretic" display technology, because it is based on the principles of electrophoresis (the movement of an electrically charged substance under the influence of an electric field). Other technologies being applied to electronic paper include electrochromic displays, modified versions of liquid crystal displays and cholesteric displays.

Turning first to FIG. 1, a cross-sectional view of electronic paper 100 is shown. The description of electronic paper herein provides one example of how electronic paper can be formed, as should be appreciated by those skilled in the art. In FIG. 1, electronic paper 100 is formed of electronic ink, which includes electrically charged particles 105 in a dielectric fluid 110. Cell walls 115 and sealing layer 145 constrain the dielectric fluid within to predetermined microcapsules or cells, including cells 120, 125 and 130. Sealing layer 145 is attached to a conductor 140 by adhesive 150. The cells, sealing layer 145 and transparent surface 160 may be formed of various types of plastic material or other similar material. In this example, transparent surface 160 is formed of PET plastic, but any other suitable material may be used. In some implementations, even conductor 140 is formed of conductive plastic. Dielectric fluid may be any convenient type of colored dielectric, such as non-toxic oil. An additional conductor layer 165 is adjacent to transparent surface 160. Because the display is viewed through conductor layer 165, conductor layer 165 is preferably also transparent, e.g. a transparent conductive plastic. The conductive layers 140 and 165 can be formed of indium tin oxide ("ITO").

In FIG. 1, in one example, particles 105 are white and are positively charged. However, other colors and charges may be used. When a negative charge is formed in area 135 of conductor 140, all of the charged particles 105 in cell 120 and a portion of the charged particles 105 in cell 125 migrate through dielectric fluid 110 towards conductor 140. Similarly, when a positive charge is formed in area 155 of conductor 140, all of the charged particles 105 in cell 130 and a portion of the charged particles 105 in cell 125 migrate through dielectric fluid 110 away from conductor 140 and towards transparent surface 160. When the white particles are adjacent to transparent surface 160, that area of the display (here, the area corresponding with cell 130 and the adjacent portion of cell 125) reflects a white "color" to viewer V. Otherwise, the display will reflect the color of the dielectric fluid, which may be any convenient color. In this example, the area of the display corresponding with cell 120 and the adjacent portion of cell 125 reflects the color of the dielectric fluid.

Multi-color electronic paper is preferably implemented to form bi-stable downloadable reel strips for use with embodiments of the present invention. In one example, multiple layers of electronic paper similar to that shown in FIG. 1 can be used to produce color configurable surfaces. One such type of color electronic paper has been jointly developed by Fujitsu Laboratories Ltd., Fujitsu Frontech Limited, and Fujitsu Limited (collectively, "Fujitsu"), and was exhibited in July of 2005 at the Tokyo International Forum. This electronic paper includes one layer for producing red, one layer for producing blue and one layer for producing green. No color filters or polarizing layers are required, though they could be used with such a product. Another type of color electronic paper that can readily be implemented in the present invention was developed by E Ink Corporation and Toppan Printing Co. Ltd. As announced on Oct. 18, 2005, this alternative type of colored electronic paper uses a color filter having a high-brightness layout (red/green/blue/white) that can present white or black for background, text, etc., as well as a range of colors and tones. Those of skill in the art will appreciate that reel strips with configurable surfaces constructed according to embodiments of the present invention can incorporate, at least in part, these and other types of color electronic paper now in existence or that will be developed in the future.

Figure 2A:
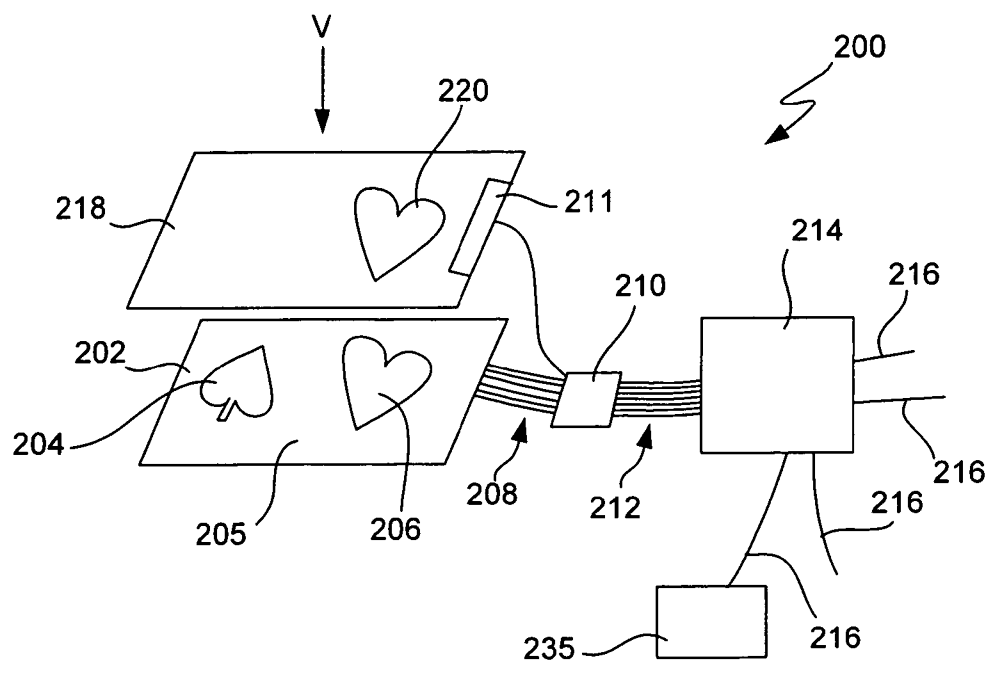
FIGS. 2A and 2B show block diagrams of configurable regions of bi-stable material and related control apparatus for displaying downloadable reel symbols, constructed according to embodiments of the present invention.
Figure 2B:
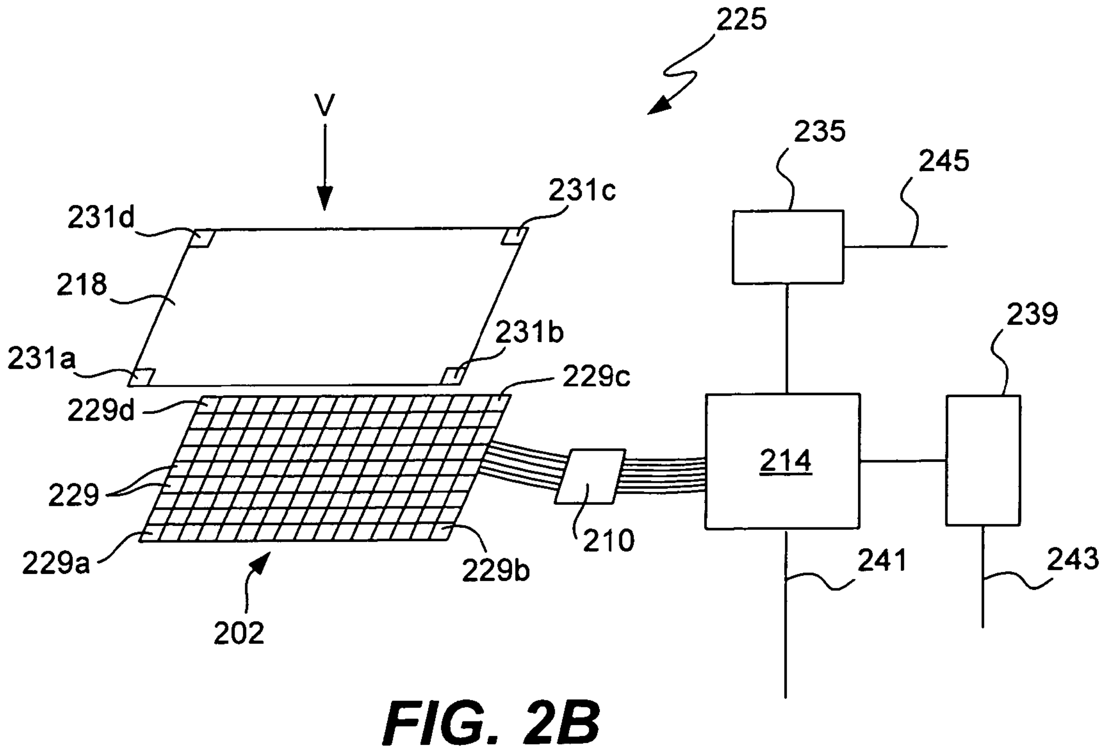

To provide control over the information displayed on the electronic paper 100, the electronic paper is laminated to a layer of circuitry. The circuitry includes patterned conductors forming a pattern of pixels that can be controlled by a suitable controller and/or processor to provide the desired resolution for display of reel symbols on the electronic paper. FIGS. 2A and 2B show examples of electronic paper control systems with control circuitry and patterned conductors to display information on regions of bi-stable downloadable reel strips constructed according to embodiments of the present invention.

In the example shown in FIG. 2A, electronic paper 200 includes patterned conductor 202 that has been segmented according to shape 204, shape 206 and background portion 205. Electronic paper 200 further includes layer 218 with cells containing dielectric and charged particles, as described above with reference to FIG. 1. Although not illustrated, layer 218 preferably incorporates additional color layers and/or a color filter to provide color electronic paper, as described above. Although layer 218 is shown to be separated from conductor 202 in FIGS. 2A and 2B, this is only for purposes of illustration; in practice, these layers are joined, e.g., by a lamination process.

A controller operatively coupled to control the output of information on the electronic paper 200 includes a driver chip 210 and display processor 214. Those skilled in the art will appreciate that driver chip 210 and display processor 214 represent one possible implementation of the controller. Driver chip 210 is in communication with conductor 202 via connections 208 and in communication with display processor 214 via connections 212. Here, common ground electrode 211 is also connected to driver 210. In alternative implementations, driver 210 may be implemented as software executed by, e.g., display processor 214. Display processor 214 may communicate with other devices, including memory 235, via connections 216.

In this example, within the area of shape 204 or 206, driver 210 will cause a charge to be applied. Accordingly, all of shape 204 or 206 may be directly driven and separately controlled. When driver 210 causes charges to be applied to shape 206, as explained above, predetermined colors, including black and white for purposes of this discussion, are visible to observer V in area 220. In one implementation, observer V would see the color, or colors, of the dielectric in the remainder of layer 218, often a white or cream color.

When layer 218 is implemented to provide multiple colors, various effects may be created, including a segmented display such as that depicted in FIG. 2A. For example, the same display may include an effect similar to that used with mosaics (e.g., tile mosaics), a patterned "fill" within a segmented area or any other desired color combination. "Pointillism" effects (wherein the perception of non-primary colors induced by the visual mixing of closely-spaced points of primary colors) may be created by distribution of colored dielectric during fabrication of layer 218 and/or by activating selected colored cells in a matrix. The latter technique may be better implemented with the version of electronic paper described below with reference to FIG. 2B.

Segmented electronic paper such as electronic paper 200 is simple to control. The instruction set for controlling electronic paper 200 can be basic. As such, it requires only a small amount of memory 235 and an inexpensive display processor 214. Segmented electronic paper may advantageously be used for static features such as symbols, logos and the like. Although these features are static, segmented electronic paper may be used to provide a range of such static features that may be switched on or off. In some implementations, however, such switching could be used to implement simple types of animated displays.

Moreover, segmented electronic paper may be used in combination with electronic paper having greater display flexibility, such as that provided by a more complex patterning in the conductor. An example of one electronic paper 225 will now be described with reference to FIG. 2B.

Electronic paper 225 is an active matrix type of electronic paper, which is made possible by a finer granularity of the patterning in conductor 202. In this example, conductor 202 has been partitioned into rectangular cells 229, each of which is independently addressable and controllable by processor 214, via driver 210. When driver 210 causes charges to be applied to cells 229*a*, 229*b*, 229*c* and 229*d* of conductor 202, charged particles and/or dielectric in layer 218, depending on the desired implementation, are visible to observer V in the corresponding cells 231*a*, 231*b*, 231*c* and 231*d*. As mentioned before, the charged particles maybe a "color" other than white, may be negatively charged, may be differentially charged on opposing sides, etc.

In FIG. 2B, although this example uses a conductor patterned into rectangular cells, any convenient cell shape may be used. If the cells are sufficiently small, they can be controlled much like pixels of an LCD or similar display device. Both static and dynamic images may be presented. Depending on the size and complexity of the display, there may be more demands on display processor 214 for an active matrix display than for a segmented display. Moreover, additional memory may be required. Therefore, in this example, display processor 214 is configured for communication with memory devices 235 and 239. Each of these devices is configured for communication with other devices, if necessary, via connections 241, 243 and 245. In this example, memory device 235 is a flash memory device and memory device 239 is an SRAM. However, any convenient type of memory device may be used.

In FIG. 2B, if layer 218 includes cells having different colors of dielectric material, cells 229 may be controlled to produce pointillism effects or similar effects. Only the three primary colors are needed to produce a wide range of perceived colors. For large configurable surfaces and/or configurable surfaces that are at a medium distance from the viewer (e.g., a wall or ceiling surface), such effects may be particularly interesting and entertaining.

Figure 3:
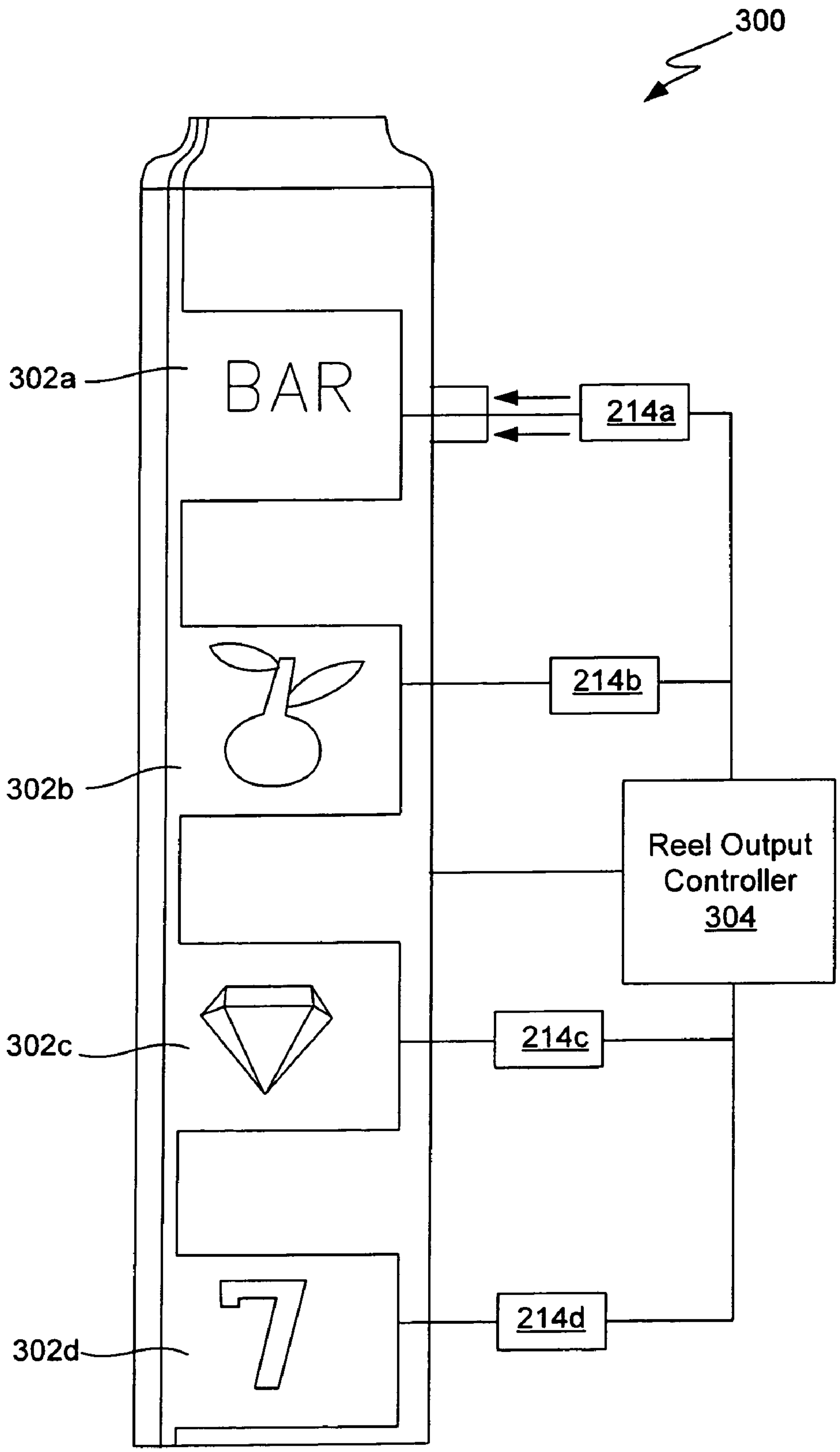
FIG. 3 shows a cutaway view of a reel strip 300 and related control apparatus, the reel strip 300 having a configurable surface of bi-stable material with configurable regions, constructed according to one embodiment of the present invention.

FIG. 3 shows a "cutaway" view of a reel strip with a bi-stable configurable surface 300 formed from electronic paper. In particular, configurable surface 300 includes multiple, contiguous electronic paper sections as configurable regions 302*a*, 302*b*, 302*c* and 302*d*. Bi-stable materials other than electronic paper may be used to define contiguous regions 302*a*, 302*b*, 302*c* and 302*d*, depending on the desired implementation. Each region is independently addressable and configurable to output one or more of a variety of output symbols of a game of chance, such as a slot game. For example, in region 302*a*, the bi-stable material defines the bar symbol shown. In region 302*b*, the bi-stable material defines a cherry symbol, and in region 302*c*, the bi-stable material defines a diamond symbol.

Figure 4:
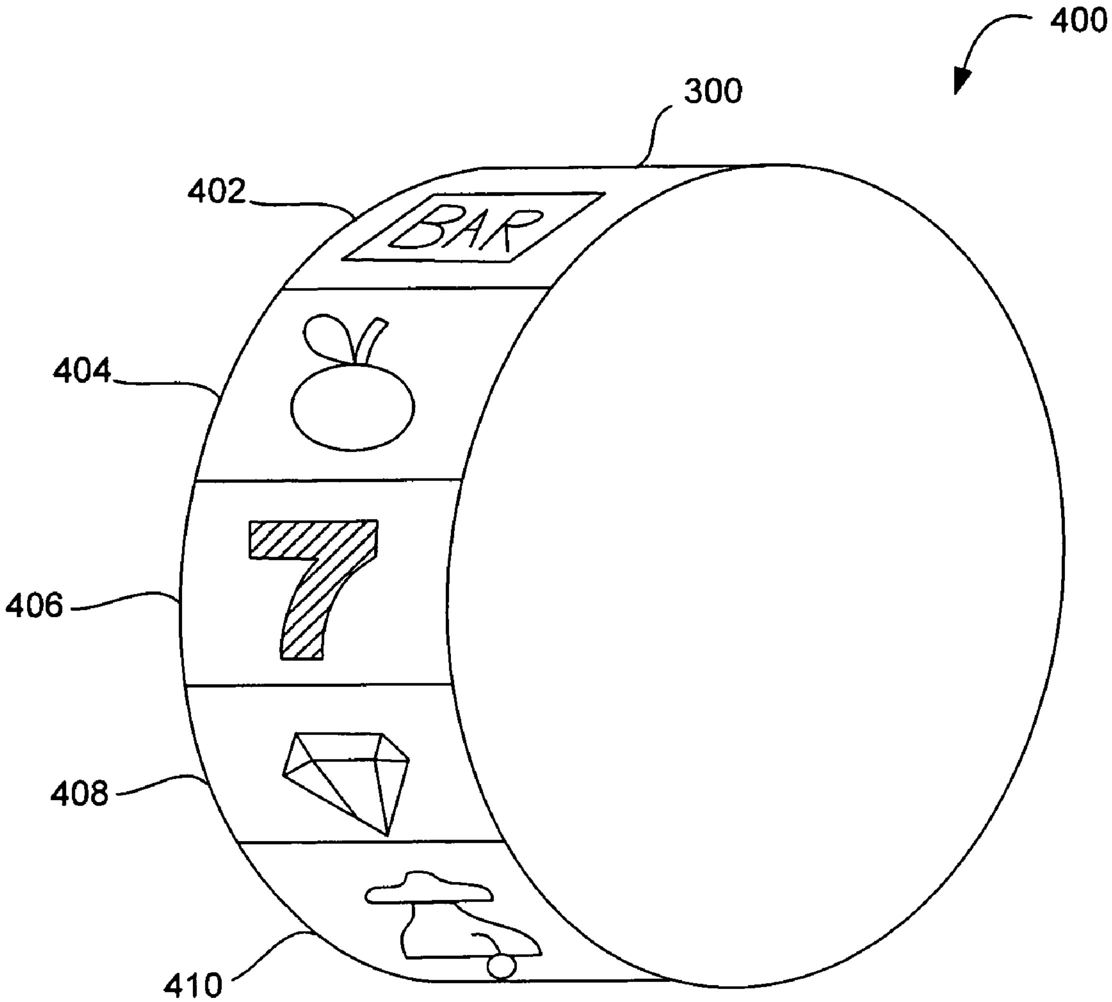
FIG. 4 shows a perspective view of a mechanical reel 400 having a reel strip defined by a configurable surface disposed on an outer circumference of the reel, constructed according to one embodiment of the present invention.

FIG. 4 shows a perspective view of a mechanical reel 400 having a reel strip defined by configurable surface 300 disposed on an outer circumference of the reel, constructed according to one embodiment of the present invention. In FIG. 4, the reel strip with configurable surface 300 is comprised of separate configurable regions 402-410, as described above. The configurable surface 300 wraps around the entire circumference of the reel strip, or a substantial portion of it. Each region 402, 404, 406, 408, and 410 is independently configurable to display selected output symbols of a slot game. For example, in one set of reel symbols, configurable region 402 is controlled to display a bar symbol, region 404 shows a cherry, region 406 shows a number 7, region 408 shows a diamond, and region 410 shows a bell.

Returning to FIG. 3, each region 302 is formed of a plurality of layers as described above, for instance, a layer 218 of electronic ink and a conductive layer 202. Other implementations of electronic paper described herein can be implemented to define the individual configurable regions 302 of electronic paper, including segmented electronic paper, and active matrix electronic paper. Those skilled in the art should appreciate that more or fewer sections of electronic paper may be used and attached along the outer circumference of a reel to define a reel strip.

In one embodiment, each bi-stable configurable region 302*a-d* in the reel strip is independently controllable. Thus, separate lines are provided to one or more of the conductive plates of each configurable region. In one embodiment, each of the configurable regions 302*a*, 302*b*, 302*c* and 302*d* of electronic paper has a corresponding processor, display driver and memory, as described above with respect to FIGS. 2A and 2B. In this implementation, the regions comprising configurable surface 300 operate, at least in part, according to instructions from a reel output controller 304, described below. Accordingly, corresponding processors 214*a*, 214*b*, 214*c* and 214*d* and associated drivers 210*a-d*, as described above, are in communication with reel output controller 304. For example, reel output controller 304 may provide instructions to processors 214*a-d* to output new or different symbols on configurable regions 302*a-d* or portions thereof, and/or may send a command to display symbols or other suitable information on configurable regions 302*a-d* according to information stored in memories 235*a*, 235*b*, 235*c* and 235*d*, etc.

Depending on the complexity of the overall display and the other devices involved, reel output controller 304 may be implemented as a component of the master gaming controller of the gaming machine. In another implementation, reel output controller 304 is implemented by one or more devices, including but not limited to a CPU, a PC or a similar device, a switch, a server, etc. Reel output controller 304 may act independently or according to instructions from another device, such as a server, a gaming machine, another reel output controller 304, etc.

As described below, some implementations of the invention provide reel output controllers that control speakers, light projectors and other devices for creating additional features of desired effects. Reel output controller 304 may cooperate with other such devices to provide an engaging and readily changeable game theme. Some such implementations may provide various group gaming features, including but not limited to group bonus events.

Reel output controller 304 may be implemented, for example, in a bank of gaming machines of a gaming establishment. In this implementation, a group of gaming machines are connected to reel output controller 304. Reel output controller 304 controls the various gaming machines to output similar or related sets of output symbols as desired to provide a common theme on all of the gaming machines in the bank. Game themes and/or output symbols may be configured according to "pull" or "bottom up" approaches as well as "push" or "top down" approaches. In a peer-to-peer configuration, the reel output controller 304 in one gaming machine is in communication with and controls the output symbols on other gaming machines in the peer-to-peer system.

Reel output controller 304 may provide instructions to a gaming machine and/or other devices. For example, reel output controller 304 may provide instructions to one or more gaming machines to change configurable surfaces or particular configurable regions within the surfaces. This change may reflect a new game theme, a group game and/or team configuration, etc., or may simply indicate a player's desire to have a different configurable surface displayed. A gaming establishment server may provide instructions to the reel output controller 304 to change not only a game theme, but also a corresponding environment for an entire bank of gaming machines, a section of a casino, etc.

In one implementation, a player may make a request (e.g., from a user input device of a gaming machine) to have different output symbols displayed, sometimes as part of a different game theme, to start playing a different game and/or to form a group for group play. In response, a server may instruct reel output controller 304 to display appropriate reel symbols and/or sets of reel symbols for one or more gaming machines. A command to change a single gaming machine's configurable surface to replace one or more symbols could be issued by reel output controller 304 to a plurality of gaming machines to make the same changes. This arrangement could simplify the hardware and/or software required by each individual gaming machine.

Figure 5A:
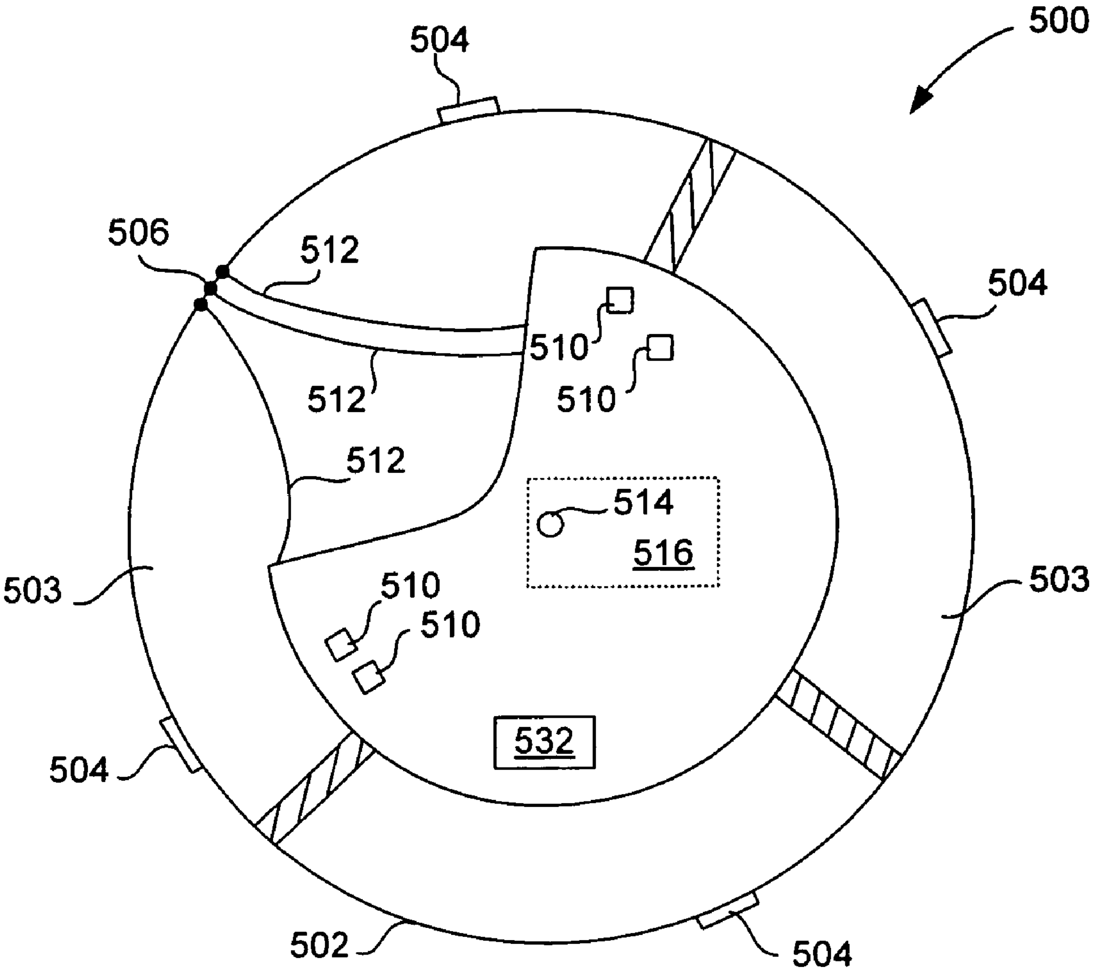
FIG. 5A shows a side view of a mechanical reel along the axis of rotation, constructed according to an embodiment of the invention.
Figure 5B:
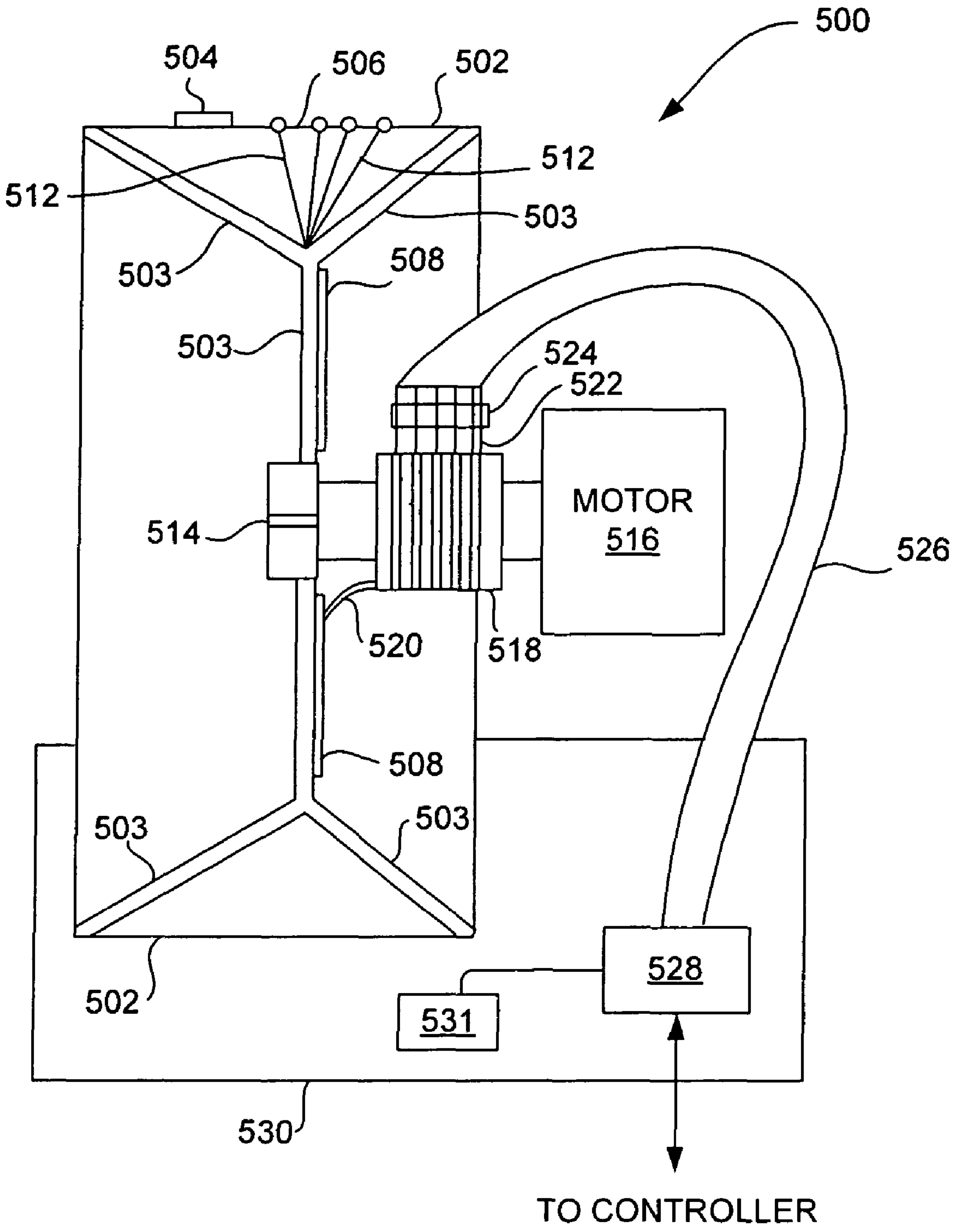
FIG. 5B shows a front view of a mechanical reel assembly, perpendicular to the axis of rotation of the mechanical reel, constructed according to an embodiment of the invention.

FIGS. 5A and 5B show cross-sectional views of a slot machine reel 500, constructed in accordance with one embodiment of the present invention. Specifically, Reel 500 includes a reel strip 502 on the outer circumferential surface of an internal or supporting member 503 of reel 500. Reel strip 502 is constructed of a configurable surface 300 having various configurable regions of bi-stable material displaying slot machine symbols, as discussed above.

In FIGS. 5A and 5B, reel strip 502 optionally includes one or more integrated circuits 504 implementing controllers which process data to control output of selected symbols on the bi-stable material of the various configurable regions. As mentioned above, in one implementation, each controller in integrated circuits 504 can incorporate a driver chip 210 and a display processor 214. In one implementation, one or more of the integrated circuits 504 can implement the reel output controller 304. In addition, in one embodiment, the integrated circuits 504 include one or more circuit elements controlling the supply of power to at least portions of the configurable regions. In one implementation, a separate power connection to each configurable region is provided, so that each configurable region can be separately powered on when an update is desired. In another implementation, all of the configurable regions are connected to the same power connection, so all of the configurable regions are powered on or off together. Data provided by an internally or externally situated reel output controller 304 or other control device such as a server can be delivered to reel strip 502 via a reel strip connection 506. Electrical power can also be supplied via a power line on reel strip connection 506.

In one embodiment, the reel output controller 304, and/or one or more of the individual controllers of the separate configurable regions, can be implemented in circuitry provided on configurable surface 300 of reel strip 502, such as integrated circuits 504 on reel strip 502. In another embodiment, the circuitry is provided on a printed circuit board 508 mounted on the interior of reel 502, as shown in FIGS. 5A and 5B. Printed circuit board 508 may include one or more integrated circuits 510 as shown. Control signals output from the circuitry on printed circuit board 508 is provided to reel strip connection 506 via a plurality of lines 512.

In FIG. 5B, supporting member 503 rotates about an axis of rotation 514 and is driven by a drive motor 516. Motor 516 also drives a slip ring drum 518 attached to axis of rotation 514. Slip ring drum 518 includes multiple contacts connected to circuitry on printed circuit board 508 by a cable 520. Thus, slip ring drum 518, cable 520 and printed circuit board 508 all rotate together about the axis of rotation during rotation of the reel by drive motor 516. Control signals and a power connection from outside the reel can be provided to the spinning reel by brushes 522 mounted to a brush block 524. Signals to the brush block 524 are provided by a cable 526 which is mounted to a connector 528. In one embodiment, lines from connector 528 are provided to an externally situated reel output controller 304. In another embodiment, the lines from connector 528 are provided to a master gaming controller, or other processing device, which controls the symbols and/or outcomes of the game of chance. The reel 502 and other similarly constructed reels are mounted on a stand 530. In one implementation, the cable 526 and connector 528 have one or more data lines providing paths for the transmission of symbol information to be displayed on designated regions of the configurable surface. A power line can be provided in cable 526 and connector 528 to power the circuitry controlling the updating and display of symbol information on the bi-stable material of the configurable regions. Alternatively, the power line can be provided in a separate cable and/or connector, depending on the desired implementation. The power supply can be a conventional supply, including inductive power coupling techniques.

One benefit of using bi-stable configurable material to form the configurable regions of the reel strips is that the control and power signals provided to the brush block 524 can be intermittent. That is, power and data signals only need to be provided when one or more configurable regions on the reel strip are updated. When the symbols have been displayed, for instance, when the reels are spinning during game play, there is no need to continue powering the individual configurable regions, nor is there a need to continue providing data to these regions. The displayed information on the region remains, regardless of whether power or data signals are provided. Thus, a switching mechanism can be operatively coupled at a desired location along the signal and power path to switch off the data signal and power between updates. In one embodiment, the switching mechanism is implemented to time the switching on of power with the sending of data in the data signal and outputting of the information for display on the configurable regions of the reel strip. Thus, in the embodiment described above, when the reels are not rotating, the slip ring drum 518 and printed circuit board 508 can be powered on for a length of time necessary to update the configurable regions, and then powered off when the update is complete.

Figure 5C:
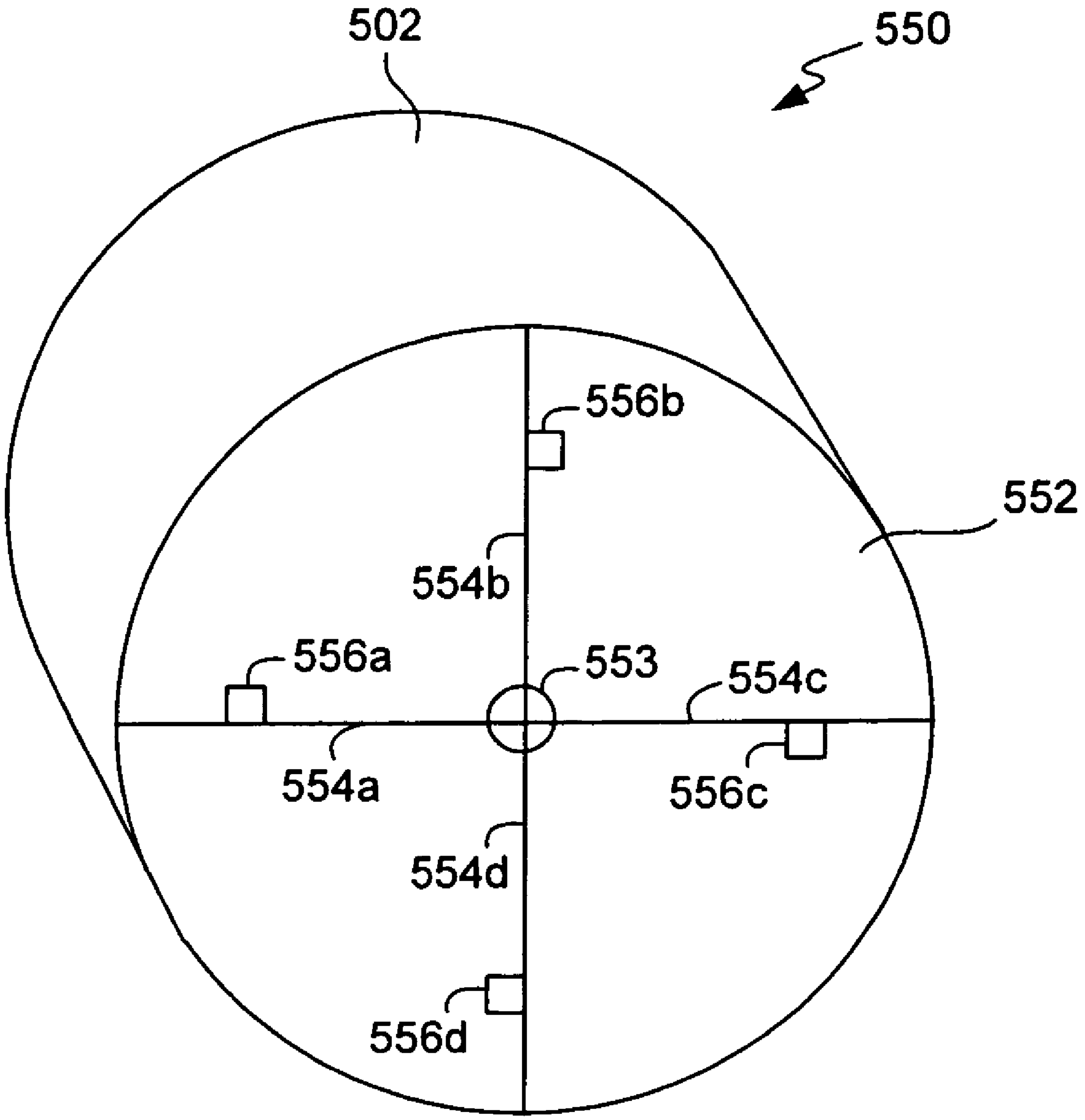
FIG. 5C shows a cross-sectional view of a reel 550 constructed according to another embodiment of the present invention.

FIG. 5C shows a cross-sectional view of a reel 550 constructed according to another embodiment of the present invention. In this embodiment, the reel 550 is constructed to provide generation of electrical power by harnessing the rotational energy of the reel 550. The reel 550 includes reel strip 502 disposed on the outer circumferential surface of an internal supporting member 552. Rather than incorporating slip rings like the embodiment of FIG. 5B, magnetic pickup coils are placed about axes of the axle 553 of reel 550. In one implementation, supporting member 552 has spokes 554*a*, 554*b*, 554*c*, and 554*d* arranged along its axes as shown in FIG. 5C. Magnetic pickup coils 556*a*, 556*b*, 556*c*, and 556*d* are mounted on or proximate to the respective spokes 554*a-d*. Electromagnets are mounted and positioned on the motor 516 of FIG. 5B or other suitable location of the reel assembly proximate the pickup coils 556*a-d*. Thus, when the electromagnets are energized, electrical energy can be generated at the magnetic pickup coils 556*a-d* when the coils move past the magnets as the reel 550 is rotated.

Figure 5D:
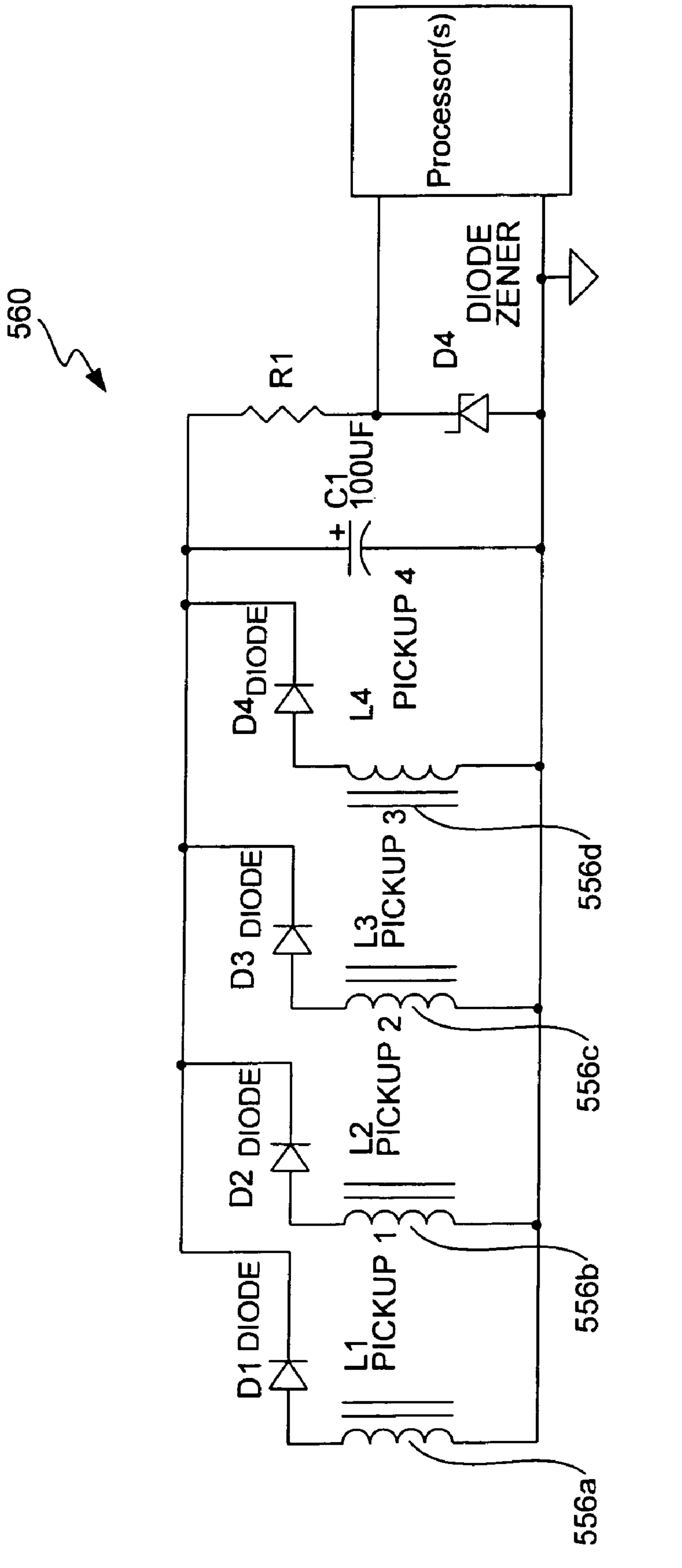
FIG. 5D shows control circuitry 560, which is coupled to rectify, store, and regulate electrical energy made available at pickup coils 556*a-d* of FIG. 5C, according to one embodiment of the present invention.

FIG. 5D shows control circuitry 560, which is coupled to rectify, store, and regulate electrical energy made available at pickup coils 556*a-d* of FIG. 5C. In FIG. 5D, control circuitry 560 includes circuit elements coupled between pickup coils 556*a-d*, and the processor(s), communications apparatus, and bi-stable material of the configurable regions. The various circuit elements are coupled as shown in FIG. 5D to regulate voltage supplied to the processors and other various apparatus on the reel assembly. The control circuitry 560 can be mounted on the reel 550, on the stand 530, or other suitable location of the reel assembly as desired, depending on the particular implementation.

In yet another alternative embodiment, power is generated using a photovoltaic cell located on the reel or reel strip. A light source is located on the motor 516 or other suitable location on the reel assembly, and positioned to energize the photovoltaic cell. As with the embodiment of FIG. 5C described above, the photovoltaic cell and light source are situated to generate electrical power by harnessing the rotational energy of the reel 550.

Returning to FIG. 5B, in one alternative embodiment, rather than communicating display information through the slip ring drum 518, cable 520, brushes 522, brush block 524, and cable 526, an optical, RF or other suitable wireless transmitter and receiver are coupled to pass the information. Thus, in this embodiment, slip ring drum 518, cable 520, brushes 522, brush block 524, and cable 526 can be omitted from the reel mechanism and replaced with wireless communications apparatus. As shown in FIGS. 5A and 5B, in one embodiment, a wireless receiver 532 is coupled to printed circuit board 508 to receive symbol display information from a wireless transmitter 531 coupled at a desirable location proximate the wireless receiver 532. Depending on the desired implementation, the wireless transmitter 531 can be mounted to stand 530 and coupled to the connector 528, as shown in FIG. 5B, or can be mounted and coupled to other apparatus of the gaming machine.

In one implementation, wireless transmitters can be portable and coupled to portable handheld devices such as PDAs, cell phones, laptop computers, and other data processing apparatus and devices. In this way, the wireless transmitters can be carried about the gaming environment by IGT technicians or other authorized individuals. Preferably, a suitable authentication process is performed before enabling communications between the transmitter and receiver. Secure communications protocols, for instance, using conventional encryption techniques, are preferably applied to pass the information. In one embodiment, transceiver apparatus including the transmitter and receiver described above are disabled during game play to prevent tampering and cheating.

In one implementation, a bank of slot machines is desirably updated to have the same or similar symbol information displayed on the reels of all the machines in the group. For instance, a plurality of machines may be located in a particular area of a gaming environment, in which the environment can be changed to reflect certain themes. When the theme changes, it can be desirable to update the graphics and information displayed on the various gaming machines in the bank. In one embodiment, the same symbol information is passed to part or all of the machines for updating the reels on the machines to show the same information. In another embodiment, a further communications line identifies particular machines to be updated. Symbol update information is routed to the appropriate machines, for instance, all or part of the machines in a bank. Wired or wireless communications techniques including those described herein can provide the transmission of data to the reels.

In an embodiment employing wireless data communications, the wireless transmitter and receiver are desirably powered on for a period of time to transmit and receive the symbol display information, and then powered off. Preferably, symbol update information is passed when the reels are stopped to avoid data corruption from noise generated by friction of mechanical parts during rotation of the reels.

In FIGS. 2 and 3, when information displayed on the configurable surface 300 is updated, in one embodiment, the reel output controller 304 passes information to the respective processors 214 to display information on the configurable regions. In another embodiment, the reel output controller 304 itself is operatively coupled to control the displayed information on each of the configurable regions of the configurable surface 300. In both embodiments, using techniques described below, the individual configurable regions are independently addressable using data designating the symbol or symbols to be displayed on the particular configurable region.

In one embodiment, using the electronic paper of FIG. 2B, the data for all of the reel strips is provided in three dimensions. Separate communications lines or channels can be provided for the respective dimensions of data. The first dimension designates a particular configurable region. For instance, on a reel strip with 22 stops, there is a separate configurable region for each stop. The configurable regions can be numbered in sequence, one for each stop. The second and third dimensions provide pixel values for the pixels in each configurable region. For instance, in a particular configurable region, the second and third dimensions of data are provided in a two-dimensional matrix of pixel values. The rows and columns of the matrix correspond to the rows and columns of the pixels on the configurable region. Thus, using the above example, there can be 22 matrices of size N×M, with pixel values of the N×M matrix provided for a configurable region of N×M pixels. The reel output controller 304 is operatively coupled to identify the stop number of the configurable region to be updated as designated in the first dimension of data, and then output the associated matrix of pixel values to the designated configurable region to be updated.

When the electronic paper embodiment of FIG. 2A is used, the three-dimensional data described above can be condensed to a smaller set of three-dimensional data, or to two-dimensional data. In one implementation, the first dimension still designates the configurable region at a particular region. Matrices of pixel values for each stop are condensed to provide enough information to indicate the symbol to be displayed on the bi-stable material of the stop. In one implementation, the symbol information is stored in memory 235, and the data provided to processor 214 simply provides an index to retrieve designated symbol information to be displayed, for instance, the number "7." Reel output controller 304 can route symbol output information associated with designated reel stops to the processor 214 controlling the bi-stable material of the designated reel stop. The symbol output information can alternatively include the symbol data to be displayed on the configurable region. When a processor 214 receives the symbol information for a particular configurable region, the processor 214 uses the information to address rows and columns of pixels to update the pixels as indicated.

Further dimensions of symbol update information can be provided, as desired for the particular implementation. In one embodiment, an additional communications line has data identifying a particular reel in a machine to be updated. Each reel can be addressable with its own address. In another embodiment, a further communications line can identify particular gaming machines to receive an update, for instance, all of the gaming machines in a bank of machines and/or certain location in a casino. Thus, in some embodiments, there are often 4or 5dimensions of symbol update information. In one example, the variable "x" provides a machine ID designating a particular machine to receive an update. The "y" variable provides reel ID information identifying reels within the machine to receive updates. The "z" variable identifies particular configurable regions corresponding to stops on the reel to receive symbol information. Each identified configurable region is provided with 1, 2, 3, or more dimensions of symbol information. For instance, when using 2 dimensions, an N×M (rows×columns) matrix of pixel values can be provided to the configurable region for update. Separate communications lines can be used to pass the data for each of the variables or dimensions of information. The information is desirably multiplexed using conventional techniques for efficient handling and processing.

Figure 6:
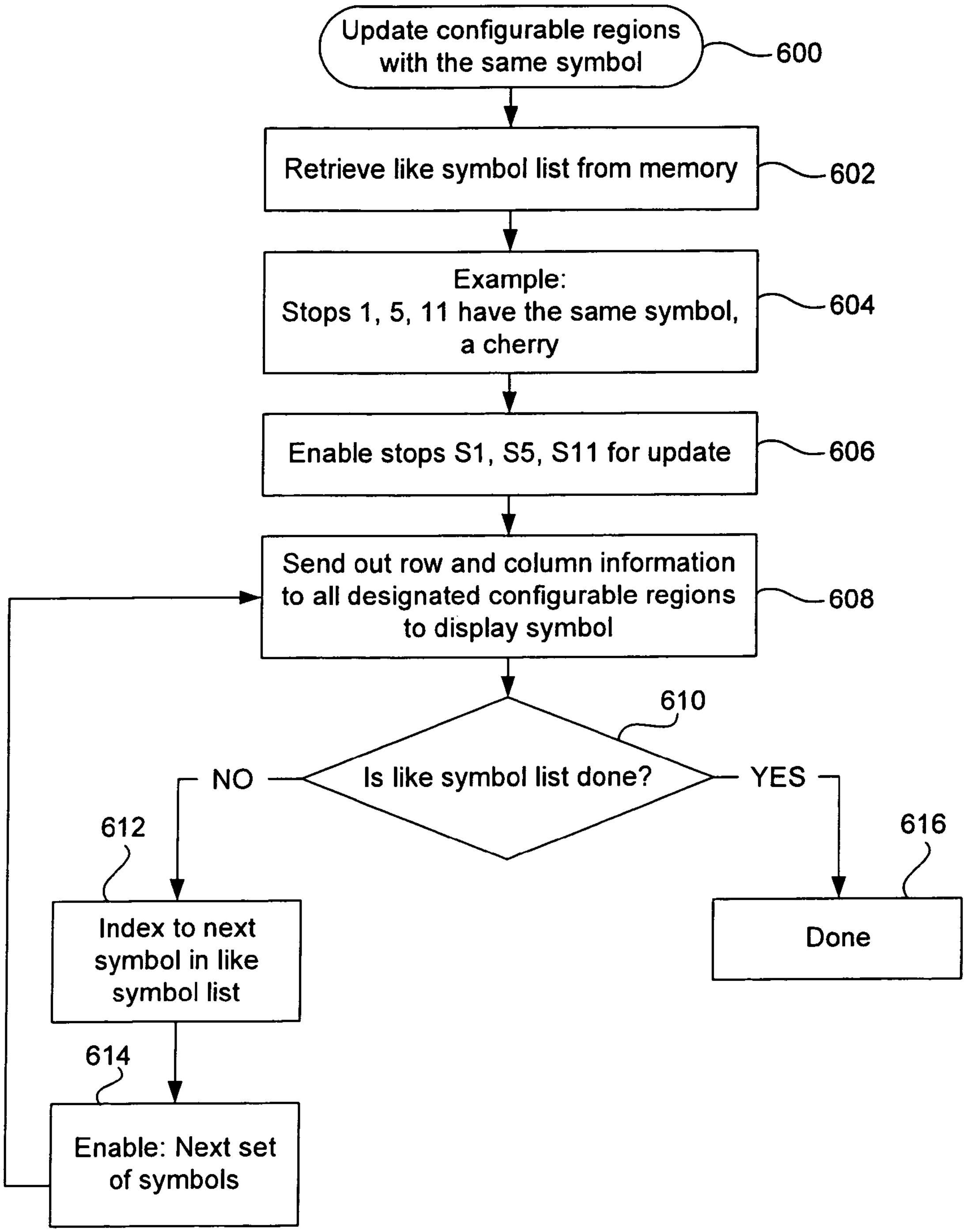
FIG. 6 shows a flow diagram of a method 600 for updating configurable regions of bi-stable material on a reel strip, performed in accordance with an embodiment of the present invention.
Figure 7:
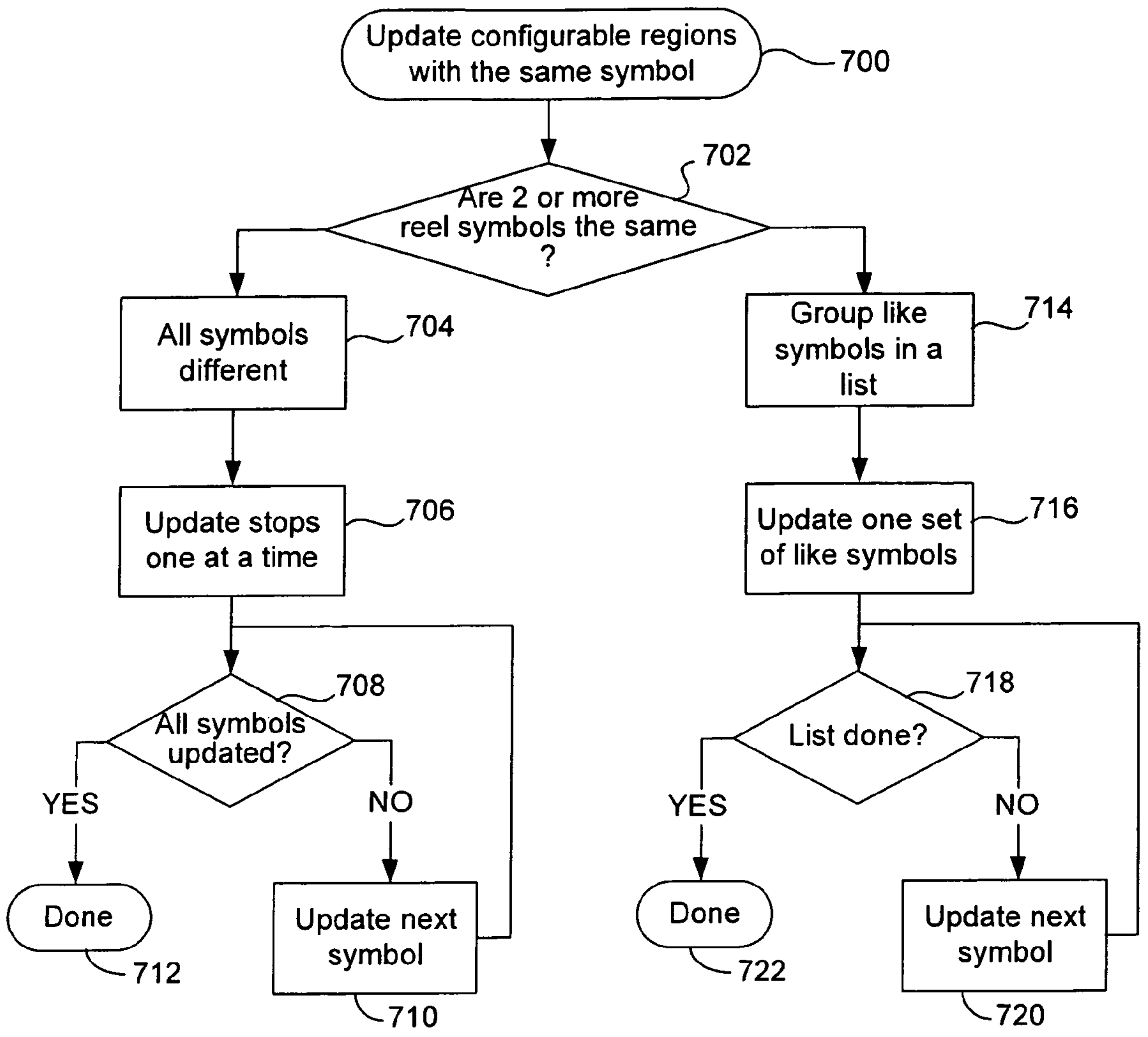
FIG. 7 shows a flow diagram of a method 700 for updating configurable regions of bi-stable material on a reel strip, performed in accordance with an embodiment of the present invention.
Figure 8:
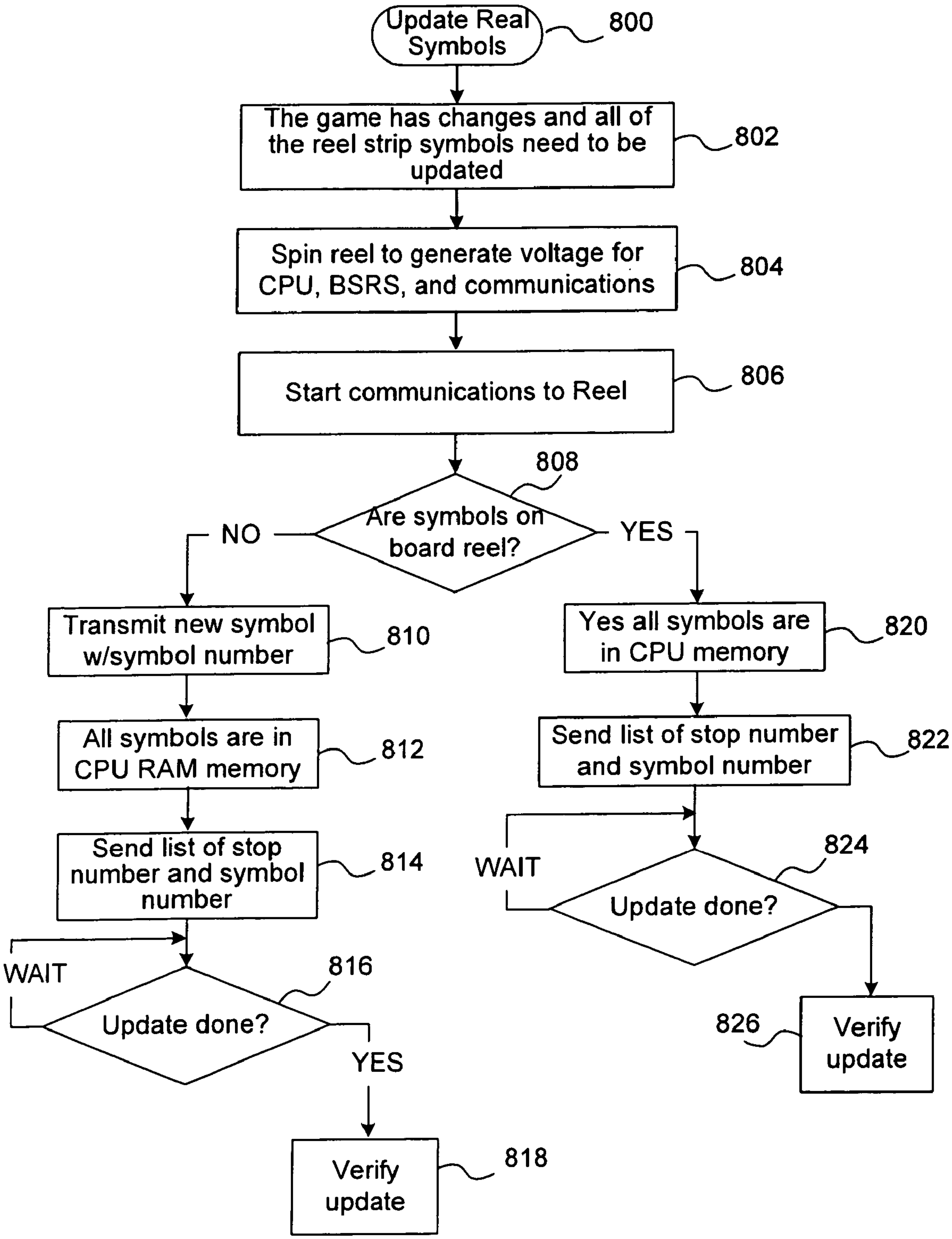
FIG. 8 shows a flow diagram of a method 800 for updating configurable regions of bi-stable material on a reel strip, performed in accordance with an embodiment of the present invention.

Methods of updating reel symbols on configurable surfaces of reels strips constructed of bi-stable material, in accordance with embodiments of the present invention, are described with respect to FIGS. 6-8. As described herein, variations on the described methods include the practicing of parts of the methods of FIGS. 6-8, the combination of these methods, and the substitution of steps of the methods as described herein. The methods in FIGS. 6-8 are desirably practiced wholly or partly by reel output controller 304, one or more processors 214, and/or the master gaming controller of the gaming machine, as described above with reference to FIGS. 2-5. In an alternative embodiment, the methods are practiced by a server, portable computing device, or other suitable data processing apparatus in communication with processors controlling the information output on the reel strips.

FIG. 6 shows a first method for updating configurable regions of one or more reel strips of bi-stable material in accordance with one embodiment of the present invention. The method 600 of FIG. 6 provides a scheme for efficiently updating two or more of the configurable regions to display the same symbol. The method 600 can be performed by reel output controller 304, in one embodiment. In another embodiment, one or more processors 214 operatively coupled to a particular configurable region perform the method 600.

In FIG. 6, the method 600 begins in step 602 with retrieval of a symbol list designating that like symbols are displayed on two or more configurable regions. This symbol list can be stored in a suitable memory device in communication with the controller or processor performing step 602. For instance, the symbol list can be stored in a flash memory coupled directly to the controller 304 or processor 214. Alternatively, the symbol list can be retrieved over a gaming communications network, or from a portable storage device in wireless or wired communication with the controller. In one implementation, the symbol list is in the form of at least two columns with the first column identifying reel stop numbers, e.g., 1-22, and the second column indicating the symbol to be displayed on each reel stop. In another implementation, the data is formatted to show a symbol in one column, and the second column indicating all of the reel stops on a reel that the symbol is to be displayed. The data can be further multiplexed to indicate additional slot machines, additional reels, and particular regions on the additional reels that should have the symbol displayed.

In FIG. 6, in step 604, the controller 304 filters the data in the symbol list to identify the stop numbers corresponding to configurable regions at which a particular symbol is to be displayed. In one example, as shown in step 604, stop numbers 1, 5, and 11 are to be updated to show the same symbol, a cherry. In step 606, the updating of the configurable regions at the designated stops, e.g., 1, 5, and 11, is enabled. This update enabling includes the controller retrieving the symbol information to display a cherry symbol. Such symbol information can be retrieved from a suitable memory device, such as memory 235 or memory 239, as described above. In addition, enabling the update of symbols in step 606 includes switching on power to the communications apparatus, such as wireless transceivers and/or slip ring drum 518, brushes 522, brush block 524, and to the processors and drivers associated with the particular configurable regions to enable the display of new information on the bi-stable material in the regions.

In FIG. 6, when power and data transmission is enabled in step 606, the method proceeds to step 608 to route pixel value information to the designated stops. For example, the same 300×400 set of pixel values for a cherry symbol can be routed to the processors and drivers controlling the configurable regions at stops 1, 5, and 11. In one embodiment, the set of pixel values are provided over communications lines to the processor(s) 214 from the reel output controller 304, as shown in FIG. 3 above. In another embodiment, the set of pixel values for the identified cherry symbol is retrieved from memory 235 using an index to the cherry symbol to look up the data.

In FIG. 6, the method 600 continues to step 610 to check whether there are remaining stops on the like symbol list that are to have updated symbols. In one embodiment, when there are remaining stops to be updated, the method proceeds to step 612 to index to the next symbol in the list, and identify the stop numbers at which that symbol is to be displayed, as described above in step 604. In step 614, the updating of the configurable regions at the identified stop numbers is enabled, as described above in step 606. From step 614, the method returns to step 610, to again determine whether all of the updates in the like symbol list have been performed. After the necessary iterations of steps 608-614, the updates are complete in step 616. Step 616 often includes turning off power to the bi-stable material of the reel strips and related controllers, drivers, and other apparatus that power and enable the update of the information on the reel strips. Because the reel strip material is bi-stable, the updated information remains on the reels, while power is conserved by switching it off.

FIG. 7 shows a second method for updating configurable regions of one or more reel strips of bi-stable material, in accordance with one embodiment of the present invention. The method 700 of FIG. 7 is based on identification of the symbols on a reel as being the same, before using a like symbol list, as described above with respect to FIG. 6. As with method 600 of FIG. 6, method 700 provides a scheme for efficiently updating two or more of the configurable regions to display the same symbol. The method 700 can be performed by reel output controller 304 and/or one or more processors 214 operatively coupled to a particular configurable region.

In FIG. 7, the method begins in step 702 by determining whether two or more configurable regions/stops on a given reel should display the same symbol, according to the game of chance or pay tables to be deployed on that gaming machine. Such determination in step 702 can be performed, for example, by checking a list or map of symbols to be displayed on the stops of the machine. Such a list can be provided as described above. In step 702, when no two or more symbols are the same, the method proceeds to step 704, at which this condition is registered, that is, all of the symbols to be displayed on the reel strip are different. Thus, in step 706, the configurable regions are updated one-at-a-time with a new symbol. The updating continues for each symbol for each stop in steps 708 and 710, until complete in step 712.

In FIG. 7, returning to step 702, when two or more configurable regions/stops are identified as displaying the same symbol, the method proceeds to step 714 in which a list of like symbols, as described above with respect to step 602 of FIG. 6, is generated. In step 716, the list is used to update sets of stops with the same symbol, as described above in steps 604-608 of FIG. 6. The updating continues in steps 718 and 720 as sets of stops and individual stops are updated with symbols as designated in the list of like symbols, until complete in step 722.

FIG. 8 shows a method 800 for updating configurable regions of one or more reel strips of bi-stable material, in accordance with one embodiment of the present invention. The method 800 incorporates a power "on" and power "off" switching mechanism, as described above, to efficiently transmit symbol information to the configurable regions for updating. The method 800 can be performed by reel output controller 304 and/or one or more processors 214 operatively coupled to a particular configurable region.

In FIG. 8, in step 802, an update signal is received, indicating that the slot game on the machine is to be updated with new symbols on one or more reel strips. The update signal can be received from an input device or mechanism operated by authorized casino personnel, a player, or from a data processing device such as a server or portable computer in communication with the reel output controller 304 and/or one or more processors 214. In step 804, in one embodiment, during spinning of the reels on plays of the slot game, voltage is generated to supply the processors, communications apparatus, and bi-stable material of the configurable regions with power. In this embodiment, the reel can be constructed with power generating and supply apparatus as described above, such as the embodiments of FIGS. 5C and 5D.

In FIG. 8, when sufficient power is generated in step 804, the power is turned on for the processors, display drivers, and other apparatus as described above so that symbol information can be communicated and updated on the reel strips. In step 806, communications are initiated to transmit symbol information to the reel output controller 304 and processors 214 to update the configurable regions. In one embodiment, a list of reel stops and associated symbols is retrieved from a memory device and scanned by the controller and/or processors. In step 808, the controller determines whether the symbol information for display of the symbols is stored on a memory device local to the reel, for instance, in memory 235 of FIGS. 2A and 2B. Often, such information is present when the same symbols have been previously displayed on the reel strip.

In FIG. 8, in step 810, when the controller and/or processors determine that the symbol information is not present, the controller routes new symbol information for update of the configurable regions. In one embodiment, the symbol information is retrieved from a memory accessible by the reel output controller 304, such as a RAM memory device, in step 812. The symbol information, in any suitable format as described above, is provided to processor 214 to update the associated configurable region. In one embodiment, in step 814, a list of stop numbers and associated symbols are used to determine the appropriate symbol information to route to each processor 214. The various configurable regions designated for update are updated in step 816, using techniques described above, including those described with reference to FIGS. 6 and 7. The updates are verified in step 818. If any of the information is not displayed properly, or other errors result, part or all of steps 810-814 can be repeated.

In FIG. 8, returning to step 808, when the symbol information is stored in local memory 235 accessible by processors 214, this availability of symbol information is confirmed in step 820. The method 800 proceeds to step 822, in which the list of stop numbers and associated symbols is provided to the reel output controller 304 and/or processors 214. The various configurable regions designated for update are updated by retrieving symbol information from local memory devices in step 824, using techniques described above. The updates are verified in step 818.

Figure 9:
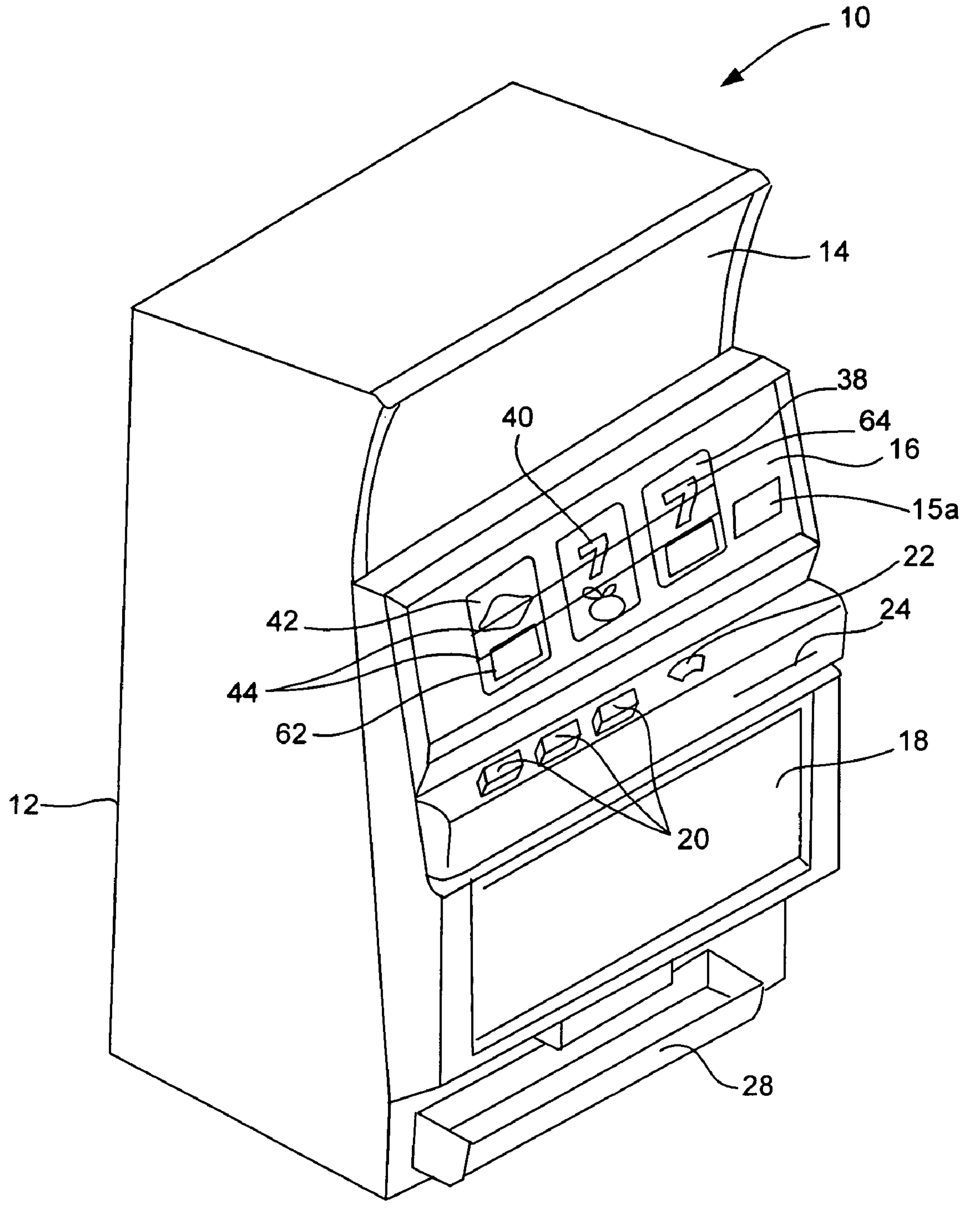
FIG. 9 shows a perspective view of a gaming machine 10 having reels constructed according to an embodiment of the present invention.

FIG. 9 shows a slot machine 10 as one example of a gaming machine suitable for use with embodiments of the present invention. The slot machine 10 includes a slot machine exterior housing 12 and a front face including a top glass 14, a main display 16, and a belly glass 18. The main display 16 includes a reel glass with windows 38, 40, and 42, each of which displays one or more reels of the slot machine. The reels are fitted with reel strips having a configurable surface constructed of a bi-stable material, such as electronic paper, as described above. The reels provided behind windows 38, 40, and 42 include configurable regions of bi-stable material which create, for example, an illuminated "bar" symbol 62 and an illuminated "7" symbol 64. Horizontal pay lines 44 span the windows and allow for multiple winning combinations. The winning combinations are defined by groupings of symbols displayed on all of the reels directly behind the pay lines, as shown in FIG. 9.

In FIG. 9, top glass 14 and belly glass 18 typically contain printed information conveying various thematic or instructive details about gaming machine 10. Glasses 14 and 18 are also typically backlit so that information printed on them is readily visible to gaming machine players. In addition, meter 15*a* within main display reel glass 16 presents primary game information such as coin insert events (e.g., a 7-segment LED meter will increase its count in region 15*a* in response to a player inserting a coin or a bill into bill acceptor 24). Player buttons 20 are provided between belly glass 18 and main display reel glass 16 and allow the player to control operation of gaming machine 10. A coin acceptor 22 and a bill acceptor 24 are provided near the play buttons as shown. Finally, a coin tray 28 is provided near the bottom of slot machine 10 to collect coin pay outs from winning plays.

Figure 10:
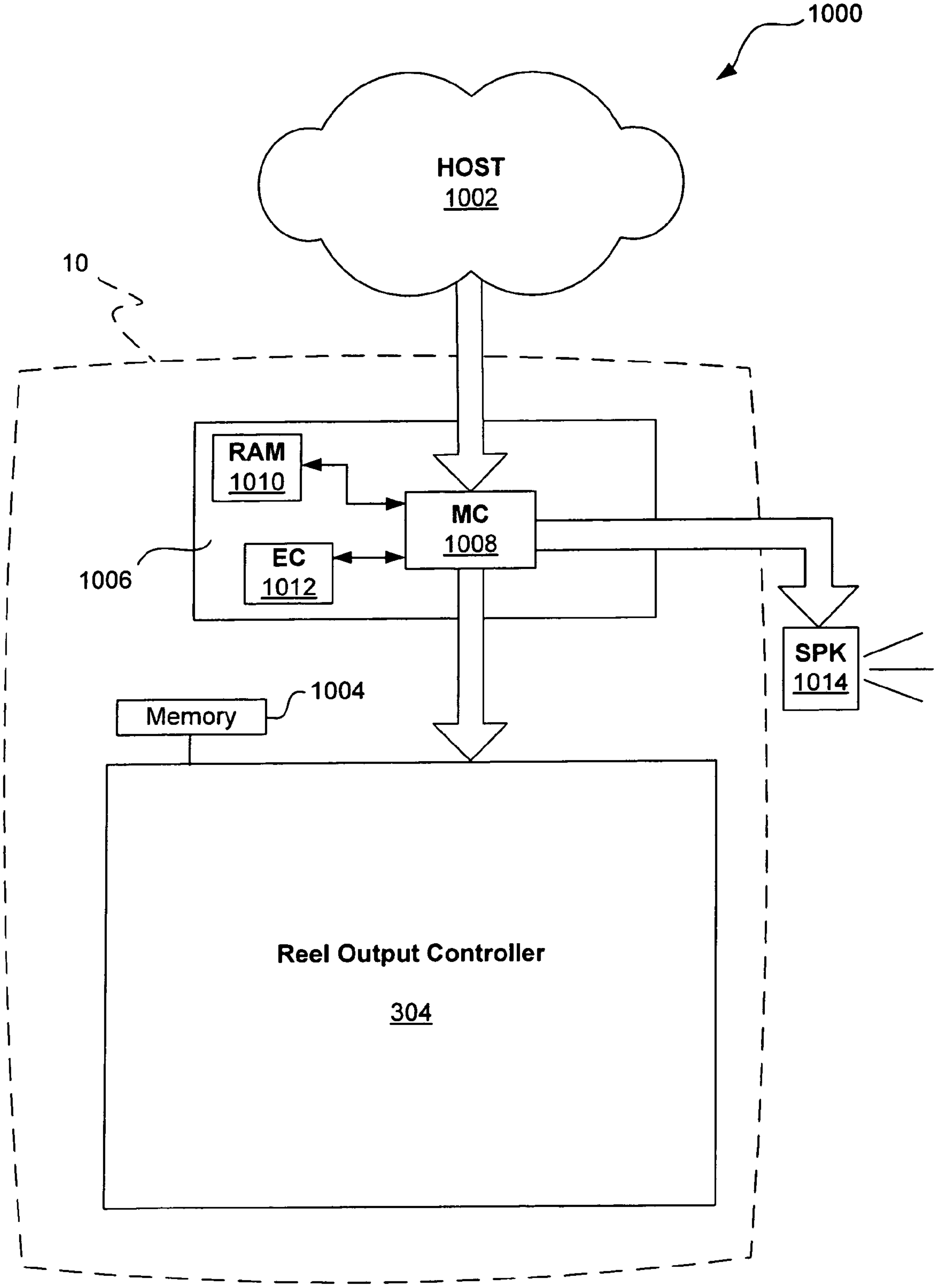
FIG. 10 shows a block diagram of a gaming system 1000 for downloading reel symbols from a host device to a gaming machine for updating configurable reel strips, constructed according to an embodiment of the present invention.

FIG. 10 shows a block diagram of a gaming system 1000 including a gaming machine 10 in communication with a host 1002 over a gaming network or other suitable wired or wireless communications path, constructed according to one embodiment of the present invention. The gaming machine 10 is implemented as a slot machine 10, as described above with respect to FIG. 9. The host 1002 can be implemented as a gaming server, further gaming machine, portable processing device such as a PDA, mobile phone, or laptop computer, or other suitable data processing apparatus. In FIG. 10, the host 1002 generally includes at least one host memory unit or other storage device in communication with the host 1002 and adapted to store symbol update information accessible to the host.

In the embodiment of FIG. 10, the symbol information indicating what symbols are to be displayed on the configurable regions of the reels is delivered by associated host 1002 to the gaming machine 10 for display. The delivery of such information can be performed responsive to a request message from the gaming machine, in some embodiments, or done at the initiative of the host operator. For instance, a timer may be set to automatically send updated symbol information from the host to one or more gaming machines in a bank in a certain gaming environment. The symbol information can be structured in one, two, or more dimensions, as described in the examples above.

In the system of FIG. 10, because symbol information is delivered from the host 1002, it is not necessary for the gaming machine 10 to have a substantial amount of ROM, flash RAM, dynamic RAM or other associated electronic storage, as might be needed to store various sets of symbol information. In one implementation, all of the dimensions of symbol information needed to update the reels is delivered from the host 1002. In an alternative implementation, a memory device 1004, in or locally accessible by the gaming machine reel output controller 304, can store part or all of the symbol information, for instance, the pixel value information for displaying various symbols, e.g., bar, 7, cherry, and others. In this implementation, the symbol information delivered from host 1002 indicates which symbols are to be displayed on which configurable regions of indicated reels in the machine, and the pixel value arrays or matrices are retrieved from memory 1004. In other implementations, additional parts of the symbol information can be stored in memory 1004 and retrieved by the reel output controller 304 responsive to receiving symbol update message signals from the host 1002.

In the embodiment of FIG. 10, symbol information is first received and acted upon by a master gaming controller 1006 having one or more electronic components constructed on a printed circuit board ("PCB") or other electronic device. The master gaming controller 1006 is generally responsible for controlling and/or processing elements of game play, money or credit intake, payouts, driving auxiliary peripherals such as speaker 1014, any network communications (if applicable), and other machine functions, as is generally known in the art. The master gaming controller 1006 for gaming machine 10 is preferably placed in communication with one or more associated storage units which may comprise ROM, RAM, static RAM or any other practicable type of memory or data storage, or any combination thereof. In addition, one or more memory units may reside directly in or on master gaming controller 1006, or may be separate and in communication with the master gaming controller 1006, and may comprise, for example, a hard disk, a disk drive, a flash drive or any other type of data storage hardware unit.

In one embodiment, a microprocessor component ("MC") 1008 of the master gaming controller 1006 or other like logic device first receives the symbol information issued by the host 1002, and in turn stores the data on an associated storage device or memory unit, such as flash RAM 1010. A controller, which may be implemented as a part of MC 1008, then reads the file or symbol data set stored in flash RAM 147 and forwards the information contained therein to reel output controller 304 for handling until the reel output controller 304 is given another set of display data or otherwise instructed to stop displaying information on the reel strips. Alternatively, the reel output controller 304 may be integrated with the MC 1008 or otherwise provided in the master gaming controller 1006 or other like logic device. Such an arrangement may be desirable due to design preferences, cost considerations, availability of off-the-shelf parts and other factors.

In one embodiment, one or more additional electronic components ("ECs") 1012 within the master gaming controller 1006 may be desired. Such an additional EC could be, for example, a separate controller, an added processor, a programmable logic device ("PLD"), a field programmable gate array or an added flash RAM or dynamic RAM unit capable of storing one or more added symbol information files or data sets, among others. In one implementation, EC 148 is an additional flash RAM unit, such that gaming machine 10 is capable of temporarily storing related video files or data sets. In one example involving a separate and independent video display implemented on the gaming machine, a Mega Jackpot amount or other pertinent information can be displayed on the video display.

In FIG. 10, in one embodiment, it may be desirable to implement MC 1008 as or one or more specialized microprocessors, depending on various added functionalities that may be desirable for a particular gaming machine. For example, it may be desirable for the master gaming controller 1006 to decompress files issued in a compressed format, and/or be able to scale symbol images depending on image size variances with respect to configurable region space and resolution. It may also be desirable for the master gaming controller 1006 to have anti-aliasing algorithms and/or be able to buffer multiple symbol images. Other desirable traits may include the ability to execute scripts, such as Java® or any other proprietary script, and/or the ability to render issued 3-D images into 2-D images, such as through the use of a virtual real-time modeling language ("VRML"). Exemplary systems and methods for rendering and providing 3-D images in a gaming machine are disclosed in commonly assigned and co-pending U.S. patent application Ser. No. 09/927,901, by LeMay, et al., filed Aug. 8, 2001, and entitled "Virtual Cameras and 3-D Gaming Environments in a Gaming Machine,"

which application is incorporated herein by reference in its entirety and for all purposes. In any of the foregoing instances, a digital signal processor ("DSP") or other like device may be a desirable additional EC within the master gaming controller 1006.

In FIG. 10, it is contemplated that a plurality of hosts be associated with a given gaming machine. Such hosts may be related, such as on a particular gaming machine network, or may be fully separate and independent from each other. For example, one host may be the master gaming controller of a gaming machine in the network, while another may be a remote autonomous host that issues symbol information updates for a casino or hotel to various gaming machines, with such data specific to an establishment operating the gaming machine being stored on an associated host memory or storage unit. One desirable effect of utilizing multiple hosts in association with a given gaming machine is that symbol information and other files and data sets can be more readily stored in a plurality of locations within and outside a gaming machine.

In a particular example of symbol image files or data sets being sent to one or more gaming machines from host 1002, a player may select one from a variety of game choices on a given multi-game machine, whereupon the host 1002 sends to the master gaming controller 1006 a file or data set of symbol information reflective of that particular player selected game. Because the master gaming controller 1006 outputs the symbol information just once and is then no longer involved with driving or monitoring each reel strip during game play, machine resources and MC activity are saved, with such resources and MGC activity then being available for other processes or enhance primary game features.

A new set of symbol information can be sent to each master gaming controller 1006 in a given machine, and output to reel output controller 304 responsive to any number of events. A player may choose to select a different game, for example, whereupon the host can then send files or data sets for symbol information images reflective of that newly selected game to the reel strips, as described above. Alternatively, if game play should stop for a given period of time, the master gaming controller 1006 may be programmed to send a separate set of image files or data sets to the reel output controller 304 on its own. In this manner, a multi-game machine can be programmed to automatically rotate complete sets of symbol information for many or all of the various possible games and themes available on that machine during a player attract phase or other similar down time.

Communication means and protocols for both internal and remote apparatus as described herein can vary widely as desired, with one exemplary use and description for standard peripheral communications within a gaming machine being disclosed in commonly assigned U.S. Pat. No. 6,251,014 to Stockdale, et al., entitled "Standard Peripheral Communication," which patent is incorporated herein by reference in its entirety and for all purposes. Communications can be made both internally within a single machine, or alternatively over a network of machines and/or servers, such as a WAN or LAN, for example. Hard-wired types of communications and protocols that can run between machines, devices and servers can include, for example, those involving Universal Serial Bus ("USB"), Firewire and proprietary cables and bus technologies.

Alternatively, any practicable wireless technology may also be implemented for communications between a host and gaming machine, including, for example, a Bluetooth® Wireless system utilizing an IEEE 802.1×standard, an alternative wireless system utilizing a similar wireless fidelity ("Wi-Fi") standard, and any other system having standard wireless communication means and protocols. Exemplary systems and methods of providing and receiving wireless communications between various devices within and associated with a gaming machine are disclosed in commonly assigned and co-pending U.S. patent application Ser. No. 10/661,404, by Silva, et al., filed Sep. 11, 2003, and entitled "Wireless Input/Output and Peripheral Devices on a Gaming Machine," which application is also incorporated herein in its entirety and for all purposes.

Figure 11:
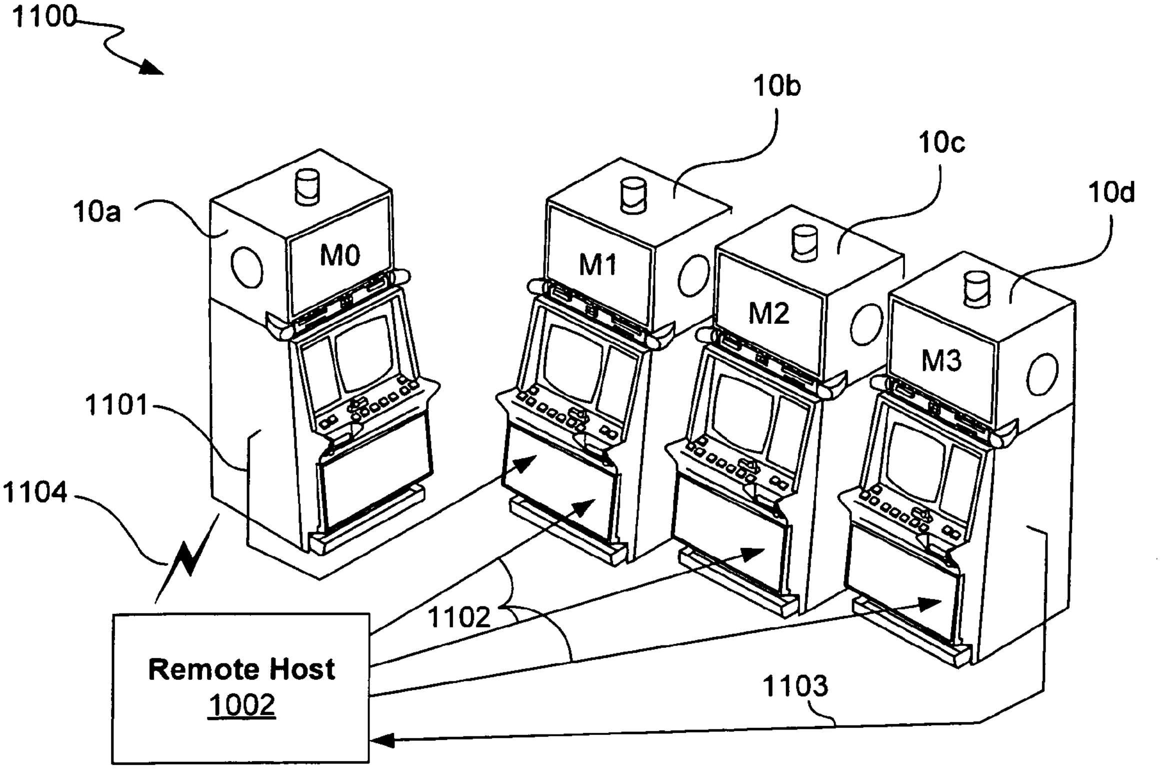
FIG. 11 shows a block diagram of a gaming system 1100 for downloading reel symbols from one gaming machine to another, constructed according to an embodiment of the present invention.

In FIG. 11, a block diagram of an exemplary gaming machine network for providing downloadable reel strip information is illustrated. Gaming machine network 1100 comprises a plurality of gaming machines 10*a*-10*d* and at least one remote host 1002, which can be, for example, a gaming server. A primary gaming machine ("M0") 10*a* can be in direct communication with at least a first separate gaming machine ("M1") 10*b*, such that M0 can function as a host for M1. Such communication from M0 to M1 can occur over, for example, a hard-wired communication line 1101. In addition, the remote host 1002 serves as a host to each of M1 10*b*, a second separate gaming machine ("M2") 10*c* and a third separate gaming machine ("M3") 10*d*, with appropriate symbol update information being sent to the various machines via hard-wired communication lines 202. As seen from the example of FIG. 11, each gaming machine in a given bank or grouping of machines can potentially be a host for one or more other machines in that group.

In FIG. 11, because it may be desirable for hosts within one or more gaming machines to provide content to other machines directly or via an intermediary conduit such as remote host 1002, each machine may have return communication abilities with remote host 1002, such as hard-wired connection 203 from M3 10*d*. Wireless communications between the various remote hosts and gaming machines may also be available if desired, such as the wireless two-way communication 204 provided between M0 10*a* and the remote host 1002. Of course, additional communications from more hosts to more gaming machines are also possible, such that every host within network 1100 can potentially be associated with every set of reels in the network.

Returning to FIGS. 2, 4, and 10, one typical flow of operation of the slot machine 10 containing bi-stable downloadable reel strips with configurable regions is as follows. The master gaming controller 1006 may determine the initial symbols to display on configurable regions of the reel strips. For example, the controller 1006 may be programmed to select symbols reflecting a currently popular game, designed to attract a player to the slot machine 10. Then, the reel output controller 304 may instruct the processors 214 and associated display drivers to display the selected symbols at a block 102. Once attracted to the slot machine 10, a user may begin game play by inserting into the slot machine 10 value that the user may bet. For example, a user may deposit tokens or coins, bills, or other appropriate items.

Once the master gaming controller 1006 recognizes that the user has deposited value, the master gaming controller may then determine the symbols to be displayed on each reel, as described above. The reel output controller 304 maybe programmed to output an infinite variety of symbols and furthermore, the criteria for determining the particular symbols to be displayed on the configurable regions may be based upon any criteria. For example, game play symbols may be themed to a particular casino, gaming machine, gaming area, and/or game show. Furthermore, the controller 304 may be programmed to dynamically change the chosen indicia before or after game play to offer the user a unique game play experience.

Once the symbols to be output or updated on the configurable regions is determined, the controller 304 may instruct the processors 214 and display drivers 210 to display the game play indicia on the configurable surfaces of the reels. The user may then place a wager and begin a game play, for example, either by pulling an arm or by depressing a spin button, either of which causes the slot machine 10 to spin the reels for a period of time.

The master gaming controller 1006 may determine the outcome of the game and determine the reel stop positions. The controller 1006 may then stop the reels from spinning according to the determined outcome of the game. As the reels are stopped, indicia representative of the game outcome may be displayed to the user on the configurable regions aligned with the pay lines on each of the associated reels. The controller 1006 may examine the indicia displayed to the user and determine the payout afforded the user based upon gaming instructions and pay tables stored within the controller 1006. For example, the gaming machine may be programmed to pay a scheduled amount if three sevens are displayed to the user. The slot machine 10 may either dispense or remove value based upon the outcome. For example, a "winning" combination of indicia pays out by dispensing value to the user, while a "losing" combination removes the value wagered by the user.

Those skilled in the art should appreciate that electronic ink is a fluid material and, therefore, can be affected by forces imposed on it. Because the electronic paper described in embodiments above is mounted in a gaming machine on rotatable reels, there will be gravitational and centrifugal forces imposed on it when the gaming machine is in operation. Those skilled in the art should appreciate that the amount of charge applied to the conductive layers in the electronic paper should be sufficient to overcome the gravitational, and even a reasonable amount of centrifugal force imposed on the reels when the configurable regions are updated during rotation. By the same token, care should be taken when setting the speed at which the motor spins the reels to ensure that the corresponding amount of centrifugal force imposed on the configurable regions does not cause the electronic ink to arbitrarily spread and distort the displayed symbol information. Those skilled in the art should keep in mind, when power is de-coupled, there is often no electrical charge to counteract gravitational and centrifugal forces imposed on the electronic paper after the configurable regions are updated, and the reels are spun for game play.

One benefit of constructing reel strips from bi-stable material, according to embodiments of the present invention, is the greater assurance of maintaining integrity of the displayed symbol information in the event of an error such as power failure. For instance, the power supply could be suspended due to an outage, or degradation of the slip rings in the embodiment described above with reference to FIG. 5B. When the configurable surface of the reel strip includes a bi-stable material, such as electronic paper, the present state of displayed symbol information is maintained during the outage. In many cases, as explained above, the power supply may have already been suspended until the next update of symbol information. By contrast, on reel strips constructed with other display technologies, such as electroluminescent elements, or any other type of display needing constant power to display information, the disconnection of power could cause the reel strip to go blank or be corrupted. When power is reconnected, such conventional reel strip displays could need manual service to be reset to an appropriate state for display of symbol information.

While the invention has been particularly shown and described with reference to specific embodiments thereof, it will be understood by those skilled in the art that changes in the form and details of the disclosed embodiments may be made without departing from the spirit or scope of the invention. For instance, the gaming network may be connected to other devices including other servers or gaming devices over the Internet or through other wired and wireless systems. Moreover, embodiments of the present invention may be employed with a variety of network protocols and architectures. Thus, the examples described herein are not intended to be limiting of the present invention. It is therefore intended that the appended claims will be interpreted to include all variations, equivalents, changes and modifications that fall within the true spirit and scope of the present invention.

What is claimed is:

1. A gaming machine comprising:

a cabinet;

at least one electromagnet mounted within the cabinet;

a player input device capable of receiving a wager for play of the game of chance;

a master gaming controller configured to provide one or more outcomes of the game of chance;

an output device configured to provide an award for a selected one of the outcomes;

a plurality of reels mounted in the cabinet, at least one of the reels including:

an internal supporting member having a curved surface defining an outer circumferential portion, the internal supporting member rotatable about an axis to display one of the symbols as a part of the one or more outcomes;

at least one magnetic pickup coil;

a reel strip mounted on the outer circumferential portion of the internal supporting member, the reel strip having a plurality of independently configurable regions of bi-stable material defining the configurable surface, the configurable regions capable of being configured to display designated symbols for the game of chance, at least one of the configurable regions of bi-stable material coupled to a processor configured to output, via the bi-stable material, symbol information designating a symbol to be displayed on the configurable region during a power on state, the bi-stable material configured to retain the designated symbol during a power-off state;

wherein, a power supply is mounted on the internal supporting member and delivers electrical power to the configurable region during the power on state, said electrical power resulting from relative motion between the at least one electromagnet and the at least one magnetic pickup coil.

2. The gaming machine of claim 1, wherein the bi-stable material is electronic paper.

3. The gaming machine of claim 1, wherein the bi-stable material is color electronic paper.

4. The gaming machine of claim 1, wherein the controller is a reel output controller.

5. The gaming machine of claim 1, wherein the controller is the master gaming controller.

6. The gaming machine of claim 1, wherein the controller includes one or more processors.

7. The gaming machine of claim 1, wherein the one or more configurable regions include a pattern of pixels.

8. The gaming machine of claim 1, further comprising: communications apparatus coupled to provide the symbol information to the controller.

9. The gaming machine of claim 8, wherein the communications apparatus includes a slip ring coupled to a brush block.

10. The gaming machine of claim 8, wherein the communications apparatus includes a wireless receiver capable of receiving the symbol information from a wireless transmitter.

11. The gaming machine of claim 1, further comprising: a switching mechanism controlling the coupling and decoupling of the power supply.

12. The gaming machine of claim 1, wherein the symbol information is provided in a plurality of dimensions of data.

13. The gaming machine of claim 12, wherein one of the dimensions of data identifies the reel.

14. The gaming machine of claim 12, wherein one of the dimensions of data identifies the configurable region.

15. The gaming machine of claim 12, wherein one or more of the dimensions of data provide the designated symbol.

16. The gaming machine of claim 15, wherein the one or more of the dimensions of data provide pixel values of designated symbol.

17. An apparatus comprising:

a reel configured to be mounted in a gaming machine cabinet for play of a game of chance, the reel having a configurable surface for controlling information shown on the reel, the cabinet having at least one electromagnet mounted therein, the reel comprising:

an internal supporting member rotatable about an axis and having a curved surface defining an outer circumferential portion;

at least one magnetic pickup coil;

a reel strip mounted on the outer circumferential portion of the internal supporting member, the reel strip having a plurality of independently configurable regions of bi-stable material defining the configurable surface, the configurable regions capable of being configured to display designated symbols for the game of chance, at least one of the configurable regions of bi-stable material coupled to a processor configured to output, via the bi-stable material, symbol information designating a symbol to be displayed on the configurable region during a power on state the bi-stable material configured to retain the designated symbol during a power off state;

wherein, a power supply is mounted on the internal supporting member and delivers electrical power to the configurable region during the power on state, said electrical power resulting from relative motion between the at least one electromagnet and the at least one magnetic pickup coil.

18. The configurable reel of claim 17, wherein the bi-stable material is electronic paper.

19. The configurable reel of claim 17, wherein the bi-stable material is color electronic paper.

20. The configurable reel of claim 17, wherein the one or more configurable regions include a pattern of pixels.

21. A configurable gaming system comprising:

a gaming machine including:

a cabinet;

at least one electromagnet mounted within the cabinet;

a player input device capable of receiving a wager for play of the game of chance;

a master gaming controller configured to provide one or more outcomes of the game of chance;

an output device configured to provide an award for a selected one of the outcomes;

a plurality of reels mounted in the cabinet, at least one of the reels including:

an internal supporting member having a curved surface defining an outer circumferential portion, the internal supporting member rotatable about an axis to display one of the symbols as a part of the one or more outcomes;

at least one magnetic pickup coil;

a reel strip mounted on the outer circumferential portion of the internal supporting member, the reel strip having a plurality of independently configurable regions of bi-stable material defining the configurable surface, the configurable regions capable of being configured to display designated symbols for the game of chance, at least one of the configurable regions of bi-stable material coupled to a processor configured to output, via the bi-stable material, symbol information designating a symbol to be displayed on the configurable region during a power on state, the bi-stable material configured to retain the designated symbol during a power-off state; and a communications interface coupled to a communications line; and a host device in communication with the communications interface of the gaming machine through the communications line, the host device configured to send the symbol information to the gaming machine through the communications line;

wherein a power supply is mounted on the internal supporting member and delivers electrical power to the configurable region during the power on state, said electrical power resulting from relative motion between the at least one electromagnet and the at least one magnetic pickup coil.

22. The system of claim 21, wherein the host device is a further gaming machine.

23. The system of claim 21, wherein the host device is a data processing apparatus selected from the group consisting of a server, a personal computer, a laptop computer, a personal digital assistant, and a mobile phone.

24. The system of claim 21, wherein the symbol information is a component of game theme information.

25. The system of claim 21, wherein the bi-stable material is color electronic paper.

26. The system of claim 21, wherein the controller is a reel output controller.

27. The system of claim 21, wherein the controller is the master gaming controller.

28. A method comprising:

receiving an update message indicating that one or more of a plurality of independently configurable regions of a reel strip are to be configured, said configurable regions comprising a bi-stable material defining a configurable surface capable of being configured to display designated symbols for a game of chance, and said reel strip is mounted on the outer circumferential portion of an internal supporting member providing a reel, said reel being mounted in a cabinet of a gaming machine and comprising at least one magnetic pickup coil, said cabinet having at least one electromagnet mounted therein, the internal supporting member rotatable about an axis to display one of the symbols;

responsive to the update message, providing power from a power supply to the one or more configurable regions to define a power on state; and outputting symbol information designating a symbol to be displayed on one or more of the configurable regions, via the bi-stable material, during the power on state, the configurable regions of bi-stable material configured to retain the designated symbols during a power off state;

wherein, the power supply is mounted on the internal supporting member and delivers electrical power to the configurable region during the power on state, said electrical power resulting from relative motion between the at least one electromagnet and the at least one magnetic pickup coil.

29. The method of claim 28, wherein the update message is received from a player input device.

30. The method of claim 28, wherein the update message is received from a controller in the gaming machine.

31. The method of claim 28, wherein the update message is received from a host device selected from the group consisting of a further gaming machine, a server, a personal computer, a laptop computer, a personal digital assistant, and a mobile phone.

32. The method of claim 28, further comprising:

retrieving a symbol list from a memory device, the symbol list providing the symbol information.

33. The method of claim 32, wherein the memory device is situated at a remote location with respect to the gaming machine.

34. The method of claim 32, wherein the memory device is coupled to the controller.

35. The method of claim 28, wherein the symbol information identifies reel stops corresponding to the one or more configurable regions.

* * * * *

UNITED STATES PATENT AND TRADEMARK OFFICE

CERTIFICATE OF CORRECTION

PATENT NO. : 8,388,432 B2
APPLICATION NO. : 11/592614
DATED : March 5, 2013
INVENTOR(S) : Mattice et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1762 days.

Signed and Sealed this
Twenty-fifth Day of November, 2014

Michelle K. Lee
*Deputy Director of the United States Patent and Trademark Office*